United States Patent
Suzuki et al.

(10) Patent No.: US 7,958,957 B2
(45) Date of Patent: Jun. 14, 2011

(54) HYBRID VEHICLE AND CONTROL METHOD THEREOF

(75) Inventors: Takashi Suzuki, Gotenba (JP); Daigo Ando, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 527 days.

(21) Appl. No.: 12/084,701

(22) PCT Filed: Dec. 12, 2006

(86) PCT No.: PCT/JP2006/324721
§ 371 (c)(1),
(2), (4) Date: May 8, 2008

(87) PCT Pub. No.: WO2007/069584
PCT Pub. Date: Jun. 21, 2007

(65) Prior Publication Data
US 2009/0120699 A1    May 14, 2009

(30) Foreign Application Priority Data
Dec. 16, 2005 (JP) .................. 2005-363777

(51) Int. Cl.
*B60W 20/00* (2006.01)
*B60W 10/06* (2006.01)
*B60W 10/08* (2006.01)
*B60W 10/24* (2006.01)
*B60K 6/442* (2007.10)

(52) U.S. Cl. ........... 180/65.265; 180/65.23; 180/65.235; 180/65.275; 180/65.28; 180/65.29; 180/65.31; 180/65.285

(58) Field of Classification Search ............. 180/65.21, 180/65.225, 65.265, 65.275, 65.28, 65.285, 180/65.29, 65.31, 65.23, 65.24
See application file for complete search history.

(56) References Cited

U.S. PATENT DOCUMENTS

| | | | |
|---|---|---|---|
| 5,992,153 A | 11/1999 | Tsuchihashi et al. | |
| 6,018,694 A * | 1/2000 | Egami et al. | 701/102 |
| 6,032,753 A | 3/2000 | Yamazaki et al. | |
| 6,059,057 A | 5/2000 | Yamazaki et al. | |
| 7,007,464 B1 * | 3/2006 | Asami et al. | 60/300 |
| 7,213,665 B2 * | 5/2007 | Yamaguchi et al. | 180/65.27 |

(Continued)

FOREIGN PATENT DOCUMENTS
JP         A-09-329060        12/1997
(Continued)

*Primary Examiner* — Hau V Phan
*Assistant Examiner* — John R Olszewski
(74) *Attorney, Agent, or Firm* — Oliff & Berridge, PLC

(57) ABSTRACT

A hybrid vehicle 20 sets a tentative limit value Win0 of determining a fuel increase relation with respect to a selected gearshift position SP for driving (S220, S230, S350), and performs increasing correction of a fuel injection amount according to either a first OT increase factor setting map or a second OT increase factor setting map that is enabled based on a relation of an input limit Win of the battery 50 to the tentative limit value Win0. Prohibition of fuel cutoff may be cancelled, based on a relation of the input limit Win to a driving force demand in an accelerator-off state set at the selected gearshift position SP. Even in this case, the increasing correction enables temperature regulation of an exhaust gas purification catalyst, with a view to controlling deterioration of the exhaust gas purification catalyst in an actual fuel cutoff condition after cancellation of the prohibition of the fuel cutoff. The deterioration of the exhaust gas purification catalyst is thus favorably controlled, irrespective of the selected gearshift position SP.

13 Claims, 14 Drawing Sheets

U.S. PATENT DOCUMENTS

| | | | |
|---|---|---|---|
| 7,392,871 B2 * | 7/2008 | Severinsky et al. | 180/65.28 |
| 2003/0172643 A1 * | 9/2003 | Suzuki | 60/284 |
| 2003/0217876 A1 * | 11/2003 | Severinsky et al. | 180/65.2 |
| 2006/0260853 A1 * | 11/2006 | Ando et al. | 180/65.3 |
| 2008/0099259 A1 * | 5/2008 | Tomo | 180/65.2 |
| 2008/0105477 A1 * | 5/2008 | Abe | 180/65.2 |
| 2008/0110684 A1 * | 5/2008 | Kaita | 180/65.2 |
| 2009/0259391 A1 * | 10/2009 | Ando et al. | 701/113 |

FOREIGN PATENT DOCUMENTS

| | | |
|---|---|---|
| JP | A-11-141364 | 5/1999 |
| JP | A-2003-207043 | 7/2003 |
| JP | A-2004-169646 | 6/2004 |
| JP | A-2004-346782 | 12/2004 |
| JP | 2007055475 A * | 3/2007 |

* cited by examiner

Fig. 10
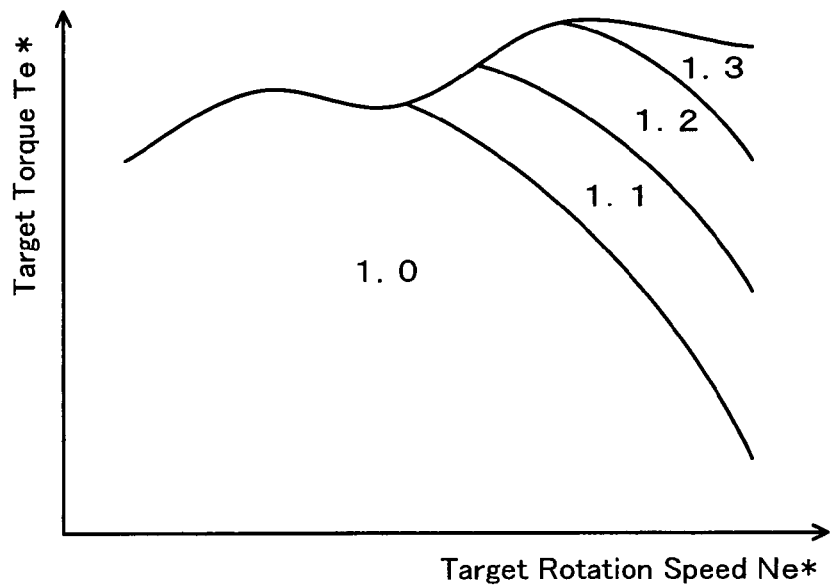
(a) First OT Increase Factor Setting Map
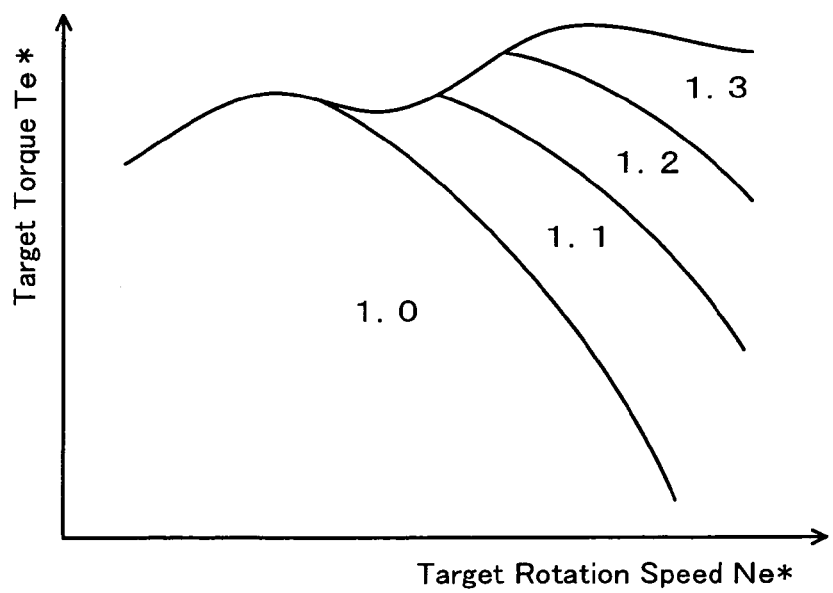
(b) Second OT Increase Factor Setting Map

Fig. 11

(a) Fuel Cutoff Prohibition Flag Fc
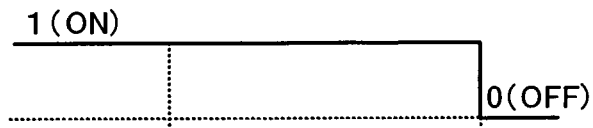

(b) Tentative Prohibition Flag Ft
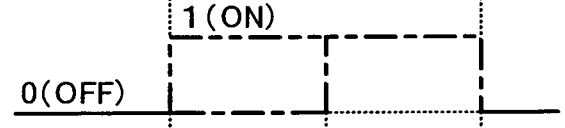

(c) Input Limit Win
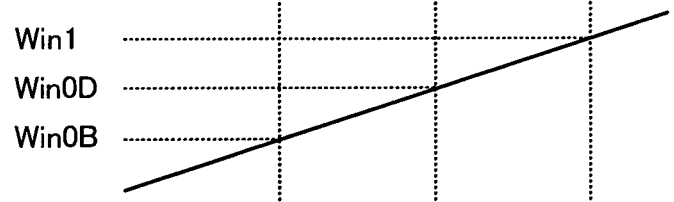

(d) OT Increase Factor

When Second OT Increase Factor Setting Map is Enabled:
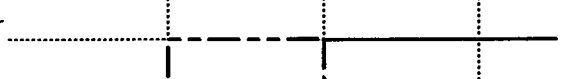

When First OT Increase Factor Setting Map is Enabled:
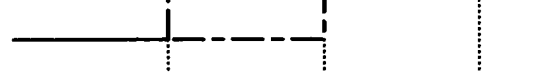

(e) Catalyst Bed Temperature Tcat

Target Catalyst Bed Temperature T1 in Control of Deterioration
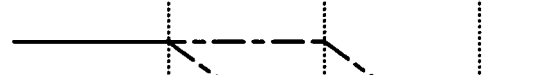

Target Catalyst Bed Temperature T2 in Prohibition of Control of Deterioration

HYBRID VEHICLE AND CONTROL METHOD THEREOF

TECHNICAL FIELD

The present invention relates to a hybrid vehicle and a control method thereof.

BACKGROUND ART

In one conventionally known structure of a hybrid vehicle, a motor generator is located between an automatic transmission and a torque converter for transmission of the output power of an internal combustion engine to a driveshaft (see, for example, Patent Document 1). With a view to preventing deterioration of a catalyst for purification of exhaust gas emitted from the internal combustion engine, the hybrid vehicle of this structure performs control of prohibiting fuel cutoff to the internal combustion engine in a higher temperature condition of the catalyst over a preset reference value. The fuel cutoff in the high temperature condition of the exhaust gas purification catalyst may cause the catalyst to be exposed to a lean atmosphere at the high temperature and to be deteriorated. The control in the hybrid vehicle of this conventional structure prohibits the fuel cutoff to the internal combustion engine at the high temperature condition of the catalyst to control deterioration of the catalyst, even in the event of a deceleration request by the driver's accelerator-off operation in a preset condition. In order to compensate for an insufficiency of deceleration due to the prohibition of the fuel cutoff, the motor generator is activated to generate the regenerative braking force, and the regenerative electric power is accumulated in an accumulator, such as a secondary battery. In this conventional hybrid vehicle, in response to a deceleration request by the driver's accelerator-off operation at the high temperature condition of the catalyst, when there is a fear of making the regenerative electric power generated by the motor generator exceed an allowable charging power of the accumulator, a hydraulic brake is used to generate a required braking force, instead of the regenerative braking force by the motor generator.

Patent Document 1: Japanese Patent Laid-Open No. 2003-207043

DISCLOSURE OF THE INVENTION

In response to the fear of making the regenerative electric power exceed the allowable charging power of the accumulator, the hydraulic brake is activated to generate the required braking force, instead of the regenerative braking force by the motor generator. Even in the high temperature condition of the catalyst, this prohibits the fuel cutoff to the internal combustion engine in order to prevent deterioration of the catalyst. It is, however, rather difficult and requires complicated control operations to make the hydraulic brake promptly generate the braking force required corresponding to the driver's accelerator-off operation. When there is a fear of making the regenerative electric power exceed the allowable charging power, it is accordingly preferable to allow the fuel cutoff and generate the braking force by engine braking while keeping the catalyst in a deterioration control state.

The hybrid vehicle generally allows the internal combustion engine to be driven at any arbitrary drive point. In order to satisfy the driver's various needs, one proposed structure is a gearshift device mounted on the hybrid vehicle to enable setting of a desired operating condition among multiple operating conditions by a change of the gearshift position. Here the multiple operating conditions define different specifications of an allowable range of driving force demand required for driving (driving force restriction) and a drive point restriction of setting a drive point of the internal combustion engine corresponding to the set driving force demand. In the hybrid vehicle equipped with this proposed gearshift device, however, in a specific operating condition of setting a relatively large braking force in response to the driver's accelerator-off operation, the regenerative braking force by the motor generator may not satisfy the braking force demand in the accelerator-off state in some condition of the allowable charging power. This leads to cancellation of the prohibition of the fuel cutoff. In the hybrid vehicle equipped with the gearshift device, the control of catalyst deterioration for the improved emission requires consideration of both the set operating condition and the allowable charging power of the accumulator.

In the hybrid vehicle and its control method, there would thus be a demand for preferably controlling deterioration of a catalyst for exhaust gas purification irrespective of an operating condition set for driving. In the hybrid vehicle and its control method, there would also be a demand for executing a series of adequate processing to control deterioration of the catalyst in the limitations of the operating condition set for driving and an allowable charging power of an accumulator.

The present invention accomplishes at least part of the demands mentioned above and the other relevant demands by the following configurations applied to the hybrid vehicle and the control method of the hybrid vehicle.

One aspect of the invention pertains to a hybrid vehicle including:

an internal combustion engine;

a catalytic converter including a catalyst for purification of an exhaust gas emitted from the internal combustion engine;

an electric power-mechanical power input output assembly connected with a first axle as one of axles of the hybrid vehicle and with an output shaft of the internal combustion engine and configured to input and output power from and to the first axle and the output shaft through input and output of electric power and mechanical power;

a motor configured to input and output power from and to either the first axle or a second axle different from the first axle;

an accumulator configured to transmit electric power to and from the electric power-mechanical power input output assembly and the motor;

an allowable charging power setting module configured to set an allowable charging power to charge the accumulator based on a state of the accumulator;

a fuel cutoff determination module configured to determine prohibition or permission for cutoff of fuel supply to the internal combustion engine, based on the set allowable charging power;

an operating condition setting module configured to set an object operating condition selected among multiple operating conditions that define different specifications of a driving force restriction of setting a driving force demand required for driving and a drive point restriction of setting a target drive point of the internal combustion engine corresponding to the set driving force demand;

a driving force-drive point setting module configured to set the driving force demand and the target drive point of the internal combustion engine based on the selected object operating condition;

a fuel increase relation setting module configured to set a fuel increase relation based on the selected object operating condition, the fuel increase relation representing a relation between the allowable charging power and an increase restriction of a fuel supply amount to the internal combustion engine for temperature regulation of the catalyst; and a controller configured to control the internal combustion engine, the electric power-mechanical power input output assembly, and the motor to drive the internal combustion engine at the set target drive point with an increase of the fuel supply amount according to the increase restriction defined by the set allowable charging power and the set fuel increase relation in response to a result of the determination by the fuel cutoff determination module and to ensure output of a driving force based on the set driving force demand.

The hybrid vehicle according to one aspect of the invention sets the driving force demand required for driving and the target drive point of the internal combustion engine according to the object operating condition selected among the multiple operating conditions. The fuel increase relation representing the relation of the allowable charging power of the accumulator to the increase restriction of the fuel supply amount to the internal combustion engine for temperature regulation of the catalyst is set according to the selected object operating condition. In response to the result of the determination between the prohibition and the permission for the cutoff of the fuel supply to the internal combustion engine based on the set allowable charging power, the operations of the internal combustion engine, the electric power-mechanical power input output assembly, and the motor are controlled to drive the internal combustion engine at the set target drive point with an increase of the fuel supply amount according to the increase restriction defined by the allowable charging power and the set fuel increase relation and to ensure output of a driving force based on the set driving force demand. The hybrid vehicle of this aspect specifies the fuel increase relation suitable for the object operating condition selected among the multiple operating conditions and increases the fuel supply amount according to the increase restriction defined by the allowable charging power and the fuel increase relation. There is a fear of prohibition of the cutoff of the fuel supply to the internal combustion engine, based on the relation of the allowable charging power to the driving force demand set according to the driving force restriction of the object operating condition. Even in this case, the increasing correction of the fuel supply amount enables temperature regulation of the catalyst, with a view to controlling deterioration of the catalyst in the actual fuel cutoff condition after cancellation of the prohibition of the cutoff of the fuel supply. This arrangement of the hybrid vehicle effectively controls deterioration of the catalyst for exhaust gas purification, irrespective of the operating condition set for driving.

In one preferable embodiment according to one aspect of the invention, the hybrid vehicle further includes a catalyst temperature detector configured to detect a temperature of the catalyst. The fuel cutoff determination module determines prohibition of the cutoff of the fuel supply, when the detected temperature of the catalyst is within a predetermined temperature range and when the set allowable charging power is not lower than a predetermined threshold limit value as charging power. The fuel increase relation enables a first increase restriction until satisfaction of a transition condition regarding a relation between the allowable charging power and tentative limit value that is greater than the threshold limit value as charging power, while enabling a second increase restriction, which has a greater increase tendency of increasing the fuel supply amount than the first increase restriction, upon satisfaction of the transition condition. The fuel increase relation setting module changes the transition condition corresponding to the set object operating condition, so as to set the fuel increase relation suitable for the object operating condition. In the hybrid vehicle of this embodiment, the cutoff of the fuel supply is prohibited under the conditions that the temperature of the catalyst is within the predetermined temperature range and that the allowable charging power is not lower than the predetermined threshold limit value as the charging power. The increasing correction of the fuel supply amount is performed according to the first increase restriction until satisfaction of the transition condition regarding the relation of the allowable charging power to the tentative limit value in the prohibition of the cutoff of the fuel supply. Upon satisfaction of the transition condition, the increasing correction of the fuel supply amount is performed according to the second increase restriction, which has the greater increase tendency of increasing the fuel supply amount than the first increase restriction. The transition condition regarding the relation of the allowable charging power to the tentative limit value is changed corresponding to the set object operating condition. Upon satisfaction of the changed transition condition, a larger value is set to the fuel supply amount to the internal combustion engine according to the second increase restriction. This arrangement ensures the adequate increasing correction of the fuel supply amount for temperature regulation of the catalyst or more specifically for the accelerated temperature decrease of the catalyst in the limitations of the operating condition set for driving and the allowable charging power of the accumulator.

In one preferable application of the hybrid vehicle of the above embodiment, the multiple operating conditions include a first operating condition and a second operating condition having a driving force restriction with a smaller lower limit of a power range than a driving force restriction of the first operating condition, the transition condition is satisfied when the allowable charging power decreases below the tentative limit value as charging power, and the fuel increase relation setting module sets the tentative limit value to a first tentative limit value in response to setting of the first operating condition as the object operating condition, while setting the tentative limit value to a second tentative limit value, which is greater than the first tentative limit value as charging power, in response to setting of the second operating condition as the object operating condition. The driving force restriction of the second operating condition has the smaller lower limit of the power range to set a relatively large braking force, compared with the driving force restriction of the first operating condition. In response to setting of the second operating condition as the object operating condition, the tentative limit value is increased to increase the fuel supply amount to the internal combustion engine at the stage having a margin in allowable charging power. There is a fear of prohibition of the cutoff of the fuel supply to the internal combustion engine, based on the relation of the allowable charging power to the driving force demand set according to the driving force restriction of the second operating condition. Even in this case, this arrangement enables temperature regulation of the catalyst, with a view to controlling deterioration of the catalyst in the actual fuel cutoff condition after cancellation of the prohibition of the cutoff of the fuel supply.

In the hybrid vehicle of the above application, the operating condition setting module may include a gearshift position setting module configured to set an object gearshift position among multiple gearshift positions in response to a driver's gearshift operation. Here the first operating condition is correlated to a drive position set for ordinary driving among the multiple gearshift positions, while the second operating condition is correlated to a specific position for setting a greater driving force demand in an accelerator-off state than a driving force demand at the drive position.

In another preferable application of the hybrid vehicle of the above embodiment, the fuel increase relation setting module sets the fuel increase relation to enable only the second increase restriction when the set object operating condition is a specific operating condition. This application increases the fuel supply amount to the internal combustion engine according to the second increase restriction, which has the greater increase tendency of increasing the fuel supply amount under the specific operating condition. There is a fear of prohibition of the cutoff of the fuel supply to the internal combustion engine, based on the relation of the allowable charging power to the driving force demand set to a relatively large braking force in the specific operating condition. Even in this case, this arrangement enables temperature regulation of the catalyst, with a view to controlling deterioration of the catalyst in the actual fuel cutoff condition after cancellation of the prohibition of the cutoff of the fuel supply.

In the hybrid vehicle of the above application, it is preferable that the operating condition setting module includes a gearshift position setting module configured to set an object gearshift position among multiple gearshift positions in response to a driver's gearshift operation, and the multiple operating conditions are correlated to the multiple gearshift positions. The multiple gearshift positions include a sequential gearshift position of allowing a driver to select an arbitrary speed as the gearshift position. The fuel increase relation setting module preferably sets the fuel increase relation to enable only the second increase restriction in response to the driver's gearshift operation to the sequential gearshift position. In the hybrid vehicle equipped with the gearshift position setting module having the sequential gearshift position, the fuel supply amount to the internal combustion engine is increased according to the second increase restriction at the moment when the driver selects the sequential gearshift position. There is a fear of prohibition of the cutoff of the fuel supply to the internal combustion engine, based on the relation of the allowable charging power to the driving force demand set corresponding to the gearshift position selected at the moment or to be selected later. Even in this case, this arrangement enables temperature regulation of the catalyst, with a view to controlling deterioration of the catalyst in the actual fuel cutoff condition after cancellation of the prohibition of the cutoff of the fuel supply.

In the hybrid vehicle according to one aspect of the invention, the electric power-mechanical power input output assembly may include a three shaft-type power input output structure connected with three shafts, the first axle, the output shaft of the internal combustion engine, and a rotatable third shaft and configured to input and output power to and from a residual shaft based on powers input to and output from any two shafts among the three shafts; and a generator configured to input and output power from and to the third shaft.

According to another aspect, the invention is directed to a control method of a hybrid vehicle, the hybrid vehicle including: an internal combustion engine; a catalytic converter including a catalyst for purification of an exhaust gas emitted from the internal combustion engine; an electric power-mechanical power input output assembly connected with a first axle as one of axles of the hybrid vehicle and with an output shaft of the internal combustion engine and configured to input and output power from and to the first axle and the output shaft through input and output of electric power and mechanical power; a motor configured to input and output power from and to either the first axle or a second axle different from the first axle; an accumulator configured to transmit electric power to and from the electric power-mechanical power input output assembly and the motor; and an operating condition setting module configured to set an object operating condition selected among multiple operating conditions that define different specifications of a driving force restriction of setting a driving force demand required for driving and a drive point restriction of setting a target drive point of the internal combustion engine corresponding to the set driving force demand, the control method including the steps of:

(a) setting an allowable charging power to charge the accumulator based on a state of the accumulator;

(b) determining prohibition or permission for cutoff of fuel supply to the internal combustion engine, based on the set allowable charging power;

(c) setting a fuel increase relation based on the selected object operating condition, the fuel increase relation representing a relation between the allowable charging power and an increase restriction of a fuel supply amount to the internal combustion engine for temperature regulation of the catalyst; and (d) controlling the internal combustion engine, the electric power-mechanical power input output assembly, and the motor to drive the internal combustion engine at a target drive point, which is set based on the drive point restriction of the object operating condition, with an increase of the fuel supply amount according to the increase restriction defined by the allowable charging power and the fuel increase relation in response to a result of the determination in the step (b) and to ensure output of a driving force based on a driving force demand, which is set based on the driving force restriction of the object operating condition.

The control method of the hybrid vehicle according to another aspect of the invention specifies the fuel increase relation suitable for the object operating condition selected among the multiple operating conditions and increases the fuel supply amount according to the increase restriction defined by the allowable charging power and the fuel increase relation. There is a fear of prohibition of the cutoff of the fuel supply to the internal combustion engine, based on the relation of the allowable charging power to the driving force demand set according to the driving force restriction of the object operating condition. Even in this case, the increasing correction of the fuel supply amount enables temperature regulation of the catalyst, with a view to controlling deterioration of the catalyst in the actual fuel cutoff condition after cancellation of the prohibition of the cutoff of the fuel supply. This arrangement of the control method effectively controls deterioration of the catalyst for exhaust gas purification, irrespective of the operating condition set for driving.

In the control method of the hybrid vehicle of the above application, the hybrid vehicle may further include a catalyst temperature detector configured to detect a temperature of the catalyst, wherein prohibition of the cutoff of the fuel supply is determined in the step (b), when the temperature of the catalyst detected by the catalyst temperature detector is within a predetermined temperature range and when the allowable charging power set in the step (a) is not lower than a predetermined threshold limit value as charging power, and the step (c) adopts the fuel increase relation, which enables a first increase restriction until satisfaction of a transition condition regarding a relation between the allowable charging power and a tentative limit value that is greater than the threshold limit value as charging power, while enabling a second increase restriction, which has a greater increase tendency of increasing the fuel supply amount than the first increase restriction, upon satisfaction of the transition condition, the step (c) changing the transition condition corresponding to the set object operating condition, so as to set the fuel increase relation suitable for the object operating condition.

In one preferable application of the control method of the hybrid vehicle of the above embodiment, the multiple operating conditions include a first operating condition and a second operating condition, having a driving force restriction with a smaller lower limit of a power range than a driving force restriction of the first operating condition, and the step (c) sets the tentative limit value to a first tentative limit value in response to setting of the first operating condition as the object operating condition, while setting the tentative limit value to a second tentative limit value, which is greater than the first tentative limit value as charging power, in response to setting of the second operating condition as the object operating condition, the transition condition being satisfied when the allowable charging power set in the step (a) decreases below the tentative limit value as charging power.

In the control method of the hybrid vehicle of the above application, the operating condition setting module may include a gearshift position setting module configured to set an object gearshift position among multiple gearshift positions in response to a driver's gearshift operation, and the first operating condition is correlated to a drive position set for ordinary driving among the multiple gearshift positions, and the second operating condition is correlated to a specific position for setting a greater driving force demand in an accelerator-off state than a driving force demand at the drive position.

The step (c) of the control method of the hybrid vehicle according to one aspect of the invention, sets the fuel increase relation to enable only the second increase restriction when the set object operating condition is a specific operating condition.

In the control method of the hybrid vehicle of the above application, it is preferable that the operating condition setting module includes a gearshift position setting module configured to set an object gearshift position among multiple gearshift positions in response to a driver's gearshift operation, and the multiple operating conditions are correlated to the multiple gearshift positions, the multiple gearshift positions include a sequential gearshift position of allowing a driver to select an arbitrary speed as the gearshift position, and the step (c) sets the fuel increase relation to enable only the second increase restriction in response to the driver's gearshift operation to the sequential gearshift position.

BRIEF DESCRIPTION OF THE DRAWINGS

FIGS. 10(a) and 10(b) respectively show a first OT increase factor setting map and a second OT increase factor setting map;

FIG. 11 is a time chart showing a variation in input limit Win, a time change of a catalyst bed temperature Tcat, and settings of an increase factor, a fuel cutoff prohibition flag Fc, and a tentative prohibition flag Ft during execution of the catalyst deterioration control routine of FIG. 9;

BEST MODES OF CARRYING OUT THE INVENTION

One mode of carrying out the invention is discussed below as a preferred embodiment.

Figure 1:
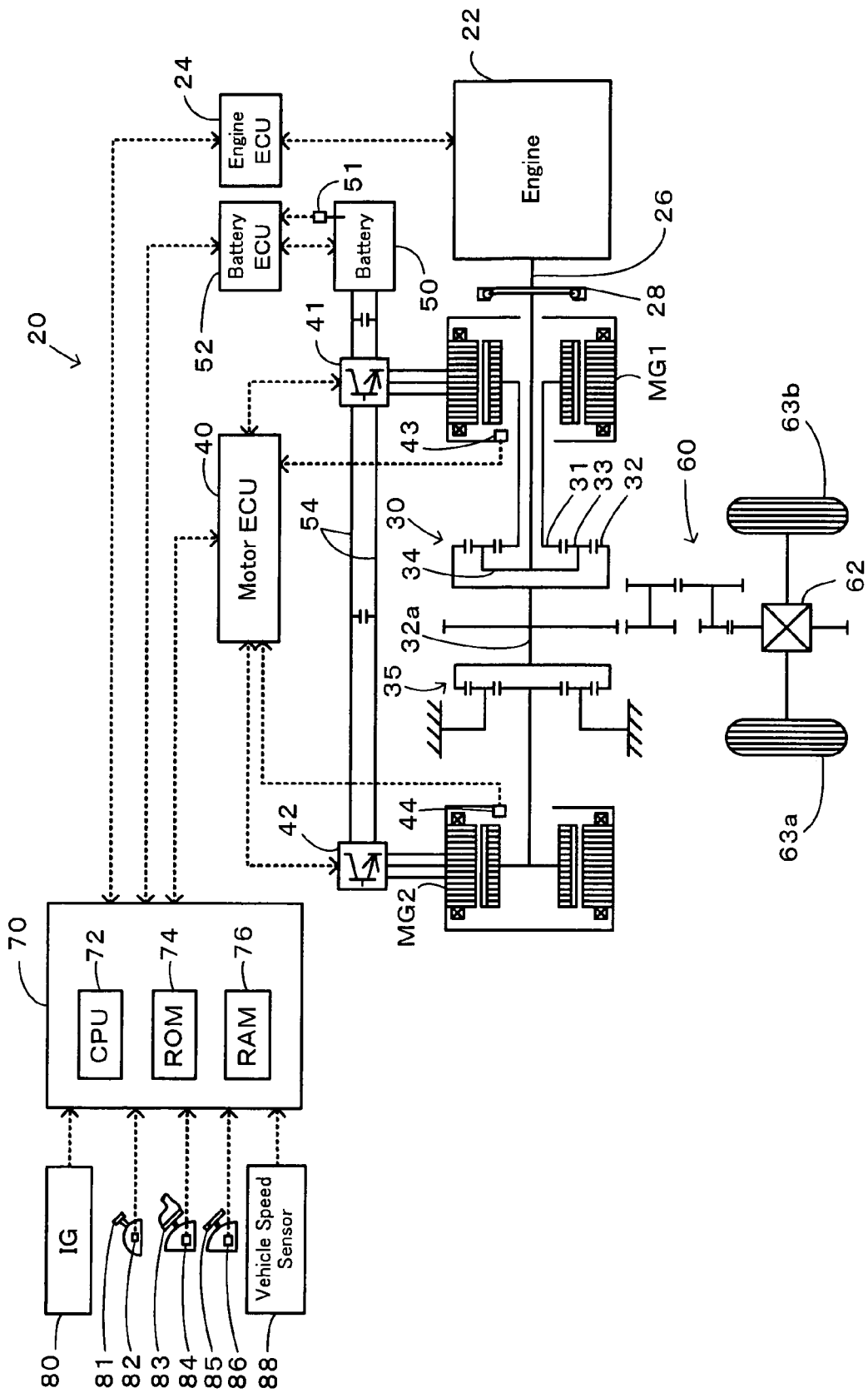
FIG. 1 schematically illustrates the configuration of a hybrid vehicle 20 in a first embodiment according to the invention.

FIG. 1 schematically illustrates the construction of a hybrid vehicle 20 in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit (hereafter referred to as hybrid ECU) 70 that controls the whole power output apparatus.

Figure 2:
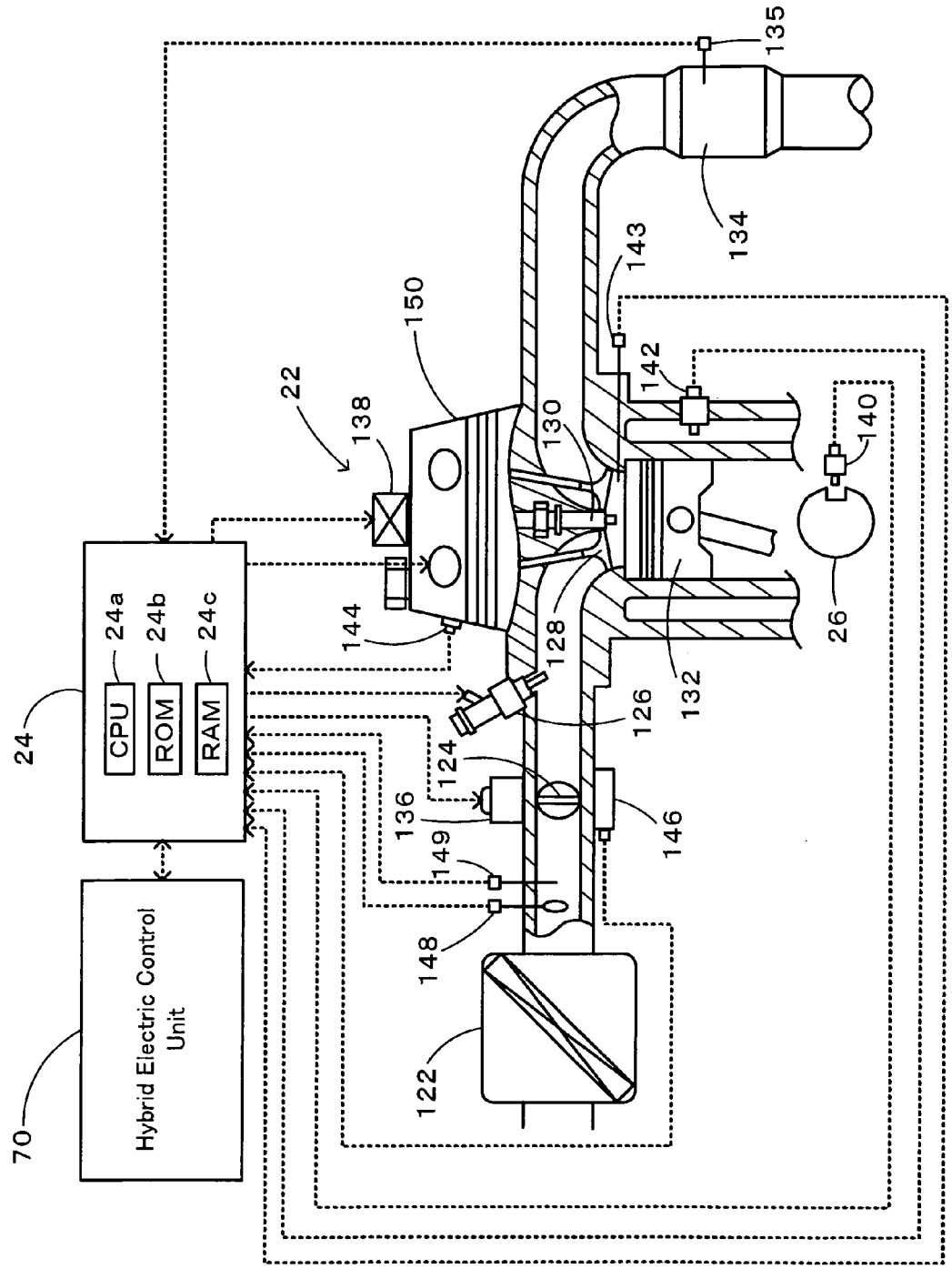
FIG. 2 shows the schematic structure of an engine 22.

The engine 22 is an internal combustion engine that consumes a hydrocarbon fuel, such as gasoline or light oil, to output power. As shown in FIG. 2, the air cleaned by an air cleaner 122 and taken into an inlet port via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 26. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air. The exhaust gas purification catalyst in the catalytic converter 134 preferably includes an oxidation catalyst, such as platinum (Pt) or palladium (Pd), a reduction catalyst, such as rhodium (Rh), and a promoting catalyst, such as ceria ($CeO_2$). The function of the oxidation catalyst converts CO and H included in the exhaust gas into water ($H_2O$) and carbon dioxide ($CO_2$), whereas the function of the reduction catalyst converts Nox included in the exhaust gas into nitrogen ($N_2$) and oxygen ($O_2$).

The engine 22 is under control of an engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port (not shown), a crank position from a crank position sensor 140 detected as the rotational position of the crankshaft 26, a cooling water temperature from a water temperature sensor 142 measured as the temperature of cooling water in the engine 22, an in-cylinder pressure from a pressure sensor 143 located inside the combustion chamber, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal from an air flow meter 148 attached to an air intake conduit, an intake air temperature from a temperature sensor 149 attached to the air intake conduit, and a catalyst bed temperature Tcat from a temperature sensor 135 attached to the catalytic converter 134. The engine ECU 24 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid ECU 70. The engine ECU 24 receives control signals from the hybrid ECU 70 to drive and control the engine 22, while outputting data regarding the driving conditions of the engine 22 to the hybrid ECU 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid ECU 70 to control operations of the motors MG1 and MG2 in response to control signals transmitted from the hybrid ECU 70 while outputting data relating to the operating conditions of the motors MG1 and MG2 to the hybrid ECU 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid ECU 70 via communication according to the requirements. The battery ECU 52 calculates a state of charge (SOC) of the battery 50, based on the accumulated charge-discharge current measured by the current sensor, for control of the battery 50.

The hybrid ECU 70 is constructed as a microprocessor including a CPU 72, a ROM 74 that stores processing programs, a RAM 76 that temporarily stores data, and a non-illustrated input-output port, and a non-illustrated communication port. The hybrid ECU 70 receives various inputs via the input port: an ignition signal from an ignition switch 80, a gearshift position SP from a gearshift position sensor 82 that detects gearshift position SP which is the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid ECU 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

In the hybrid vehicle 20 of the embodiment, available options of the gearshift position SP of the gearshift lever 81 include a brake position (hereafter referred to as 'B position') mainly selected for relatively high-speed downhill driving, in addition to a parking position for parking, a reverse position for reverse driving, a neutral position, and a conventional drive position for forward driving (hereafter referred to as 'D position'). Operating conditions specifying a driving force restriction of setting a driving force demand required for driving and a drive point restriction of setting a drive point of the engine 22 corresponding to the set driving force demand are correlated to the D position and the B position. In response to selection of the D position as the gearshift position SP, a torque demand Tr* is set as a driving force demand corresponding to the driver's depression amount of the accelerator pedal 83 in a specific power range as the driving force restriction correlated to the D position. A target rotation speed Ne* and a target torque Te* defining a target drive point of the engine 22 are set corresponding to the set torque demand Tr* according to the drive point restriction determined to ensure efficient operation of the engine 22. In response to selection of the B position as the gearshift position SP, the torque demand Tr*, the target rotation speed Ne*, and the target torque Te* are similarly set according to the driving force restriction and the drive point restriction correlated to the B position. In this embodiment, the driving force restriction and the drive point restriction correlated to the B position are fundamentally similar to those correlated to the D position. The driving force restriction in the operating conditions correlated to the B position has a smaller lower limit of the power range (to give a greater braking force), compared with the driving force restriction in the operating condition correlated to the D position. In an accelerator-off state under preset conditions, a greater braking force is thus applied at the B position than the braking force at the D position.

The hybrid vehicle 20 of the embodiment thus constructed calculates a torque demand Tr* to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand Tr* to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
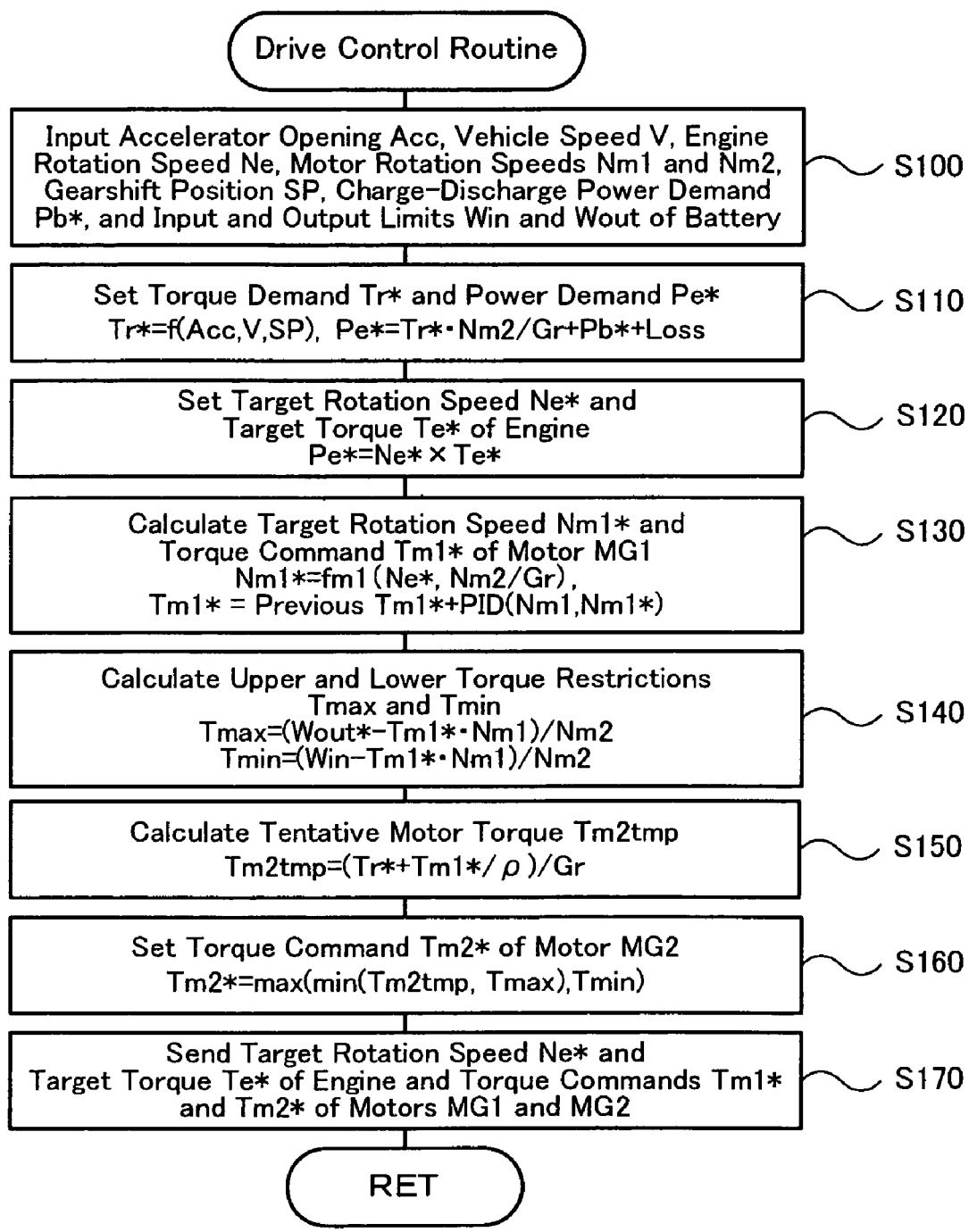
FIG. 3 is a flowchart showing a drive control routine executed in an accelerator-on state by a hybrid ECU 70 in the first embodiment.

The description regards the operations of the hybrid vehicle 20 of the embodiment having the configuration discussed above, especially a series of operation control in an accelerator-on state with operation of the engine 22 in the hybrid vehicle 20. FIG. 3 is a flowchart showing a drive control routine executed in the accelerator-on state by the hybrid ECU 70. This routine is repeatedly performed at preset time intervals (for example, at every several msec) in the accelerator-on state specified by the driver's accelerator operation.

Figure 4:
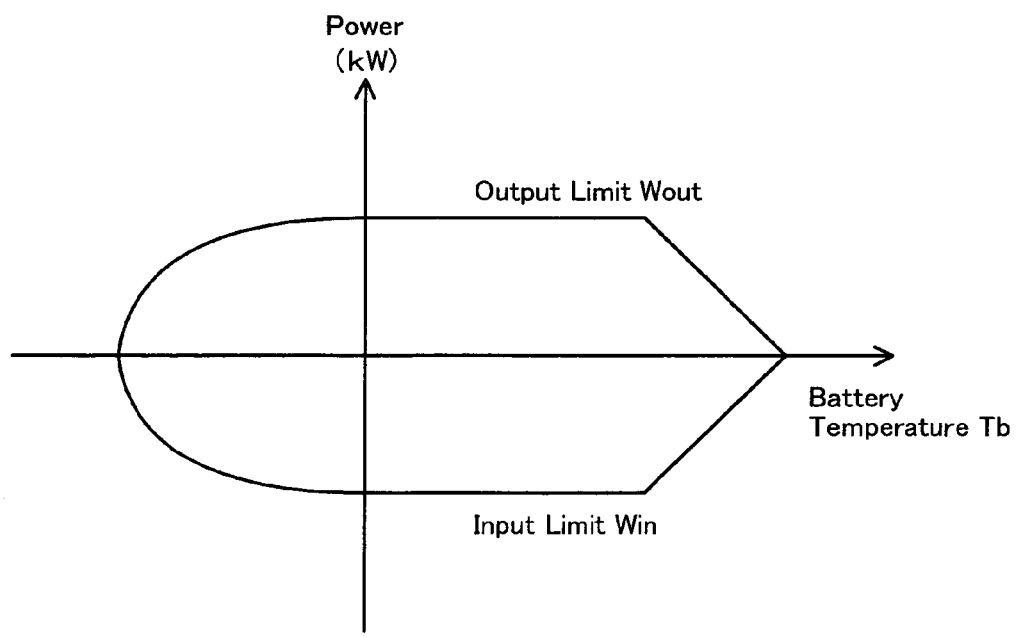
FIG. 4 shows variations of an input limit Win and an output limit Wout against battery temperature Tb of a battery 50.
Figure 5:
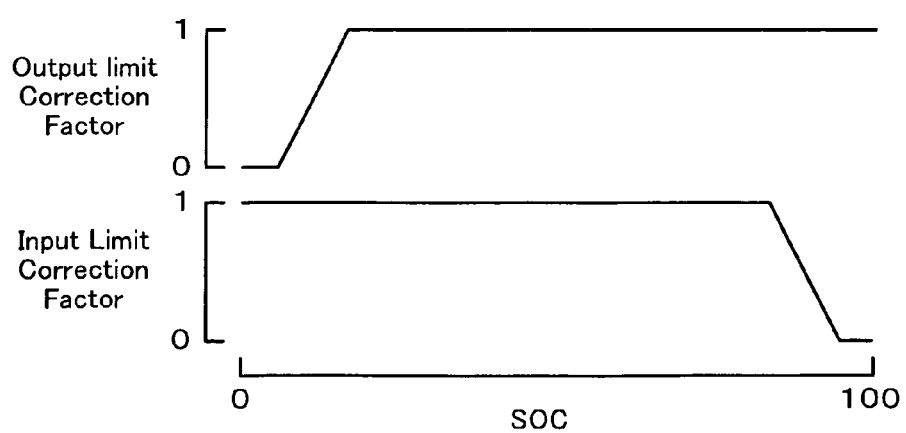
FIG. 5 shows variations of an input limit correction factor and an output limit correction factor against state of charge SOC of the battery 50.

At the start of the drive control routine of FIG. 3, the CPU 72 of the hybrid ECU 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, the gearshift position SP from the gearshift position sensor 82, a charge-discharge power demand Pb* to be charged into or discharged from the battery 50, and an input limit Win and an output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The charge-discharge power demand Pb* is received from the battery ECU 52 by communication. The input limit Win and the output limit Wout of the battery 50 are set based on the battery temperature Tb and the state of charge SOC of the battery 50 and are received from the battery ECU 52 by communication. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50. FIG. 4 shows variations of the input limit Win and the output limit Wout against the battery temperature Tb. FIG. 5 shows variations of the input limit correction factor and the output limit correction factor against the state of charge SOC of the battery 50.

Figure 6:
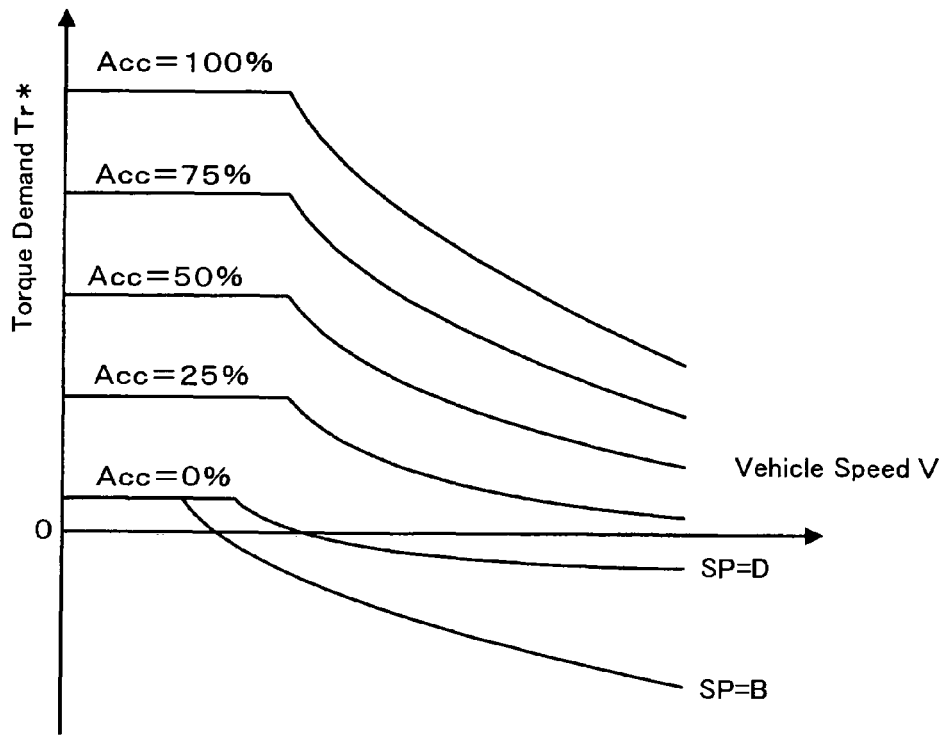
FIG. 6 shows a torque demand setting map in the first embodiment.
Figure 7:
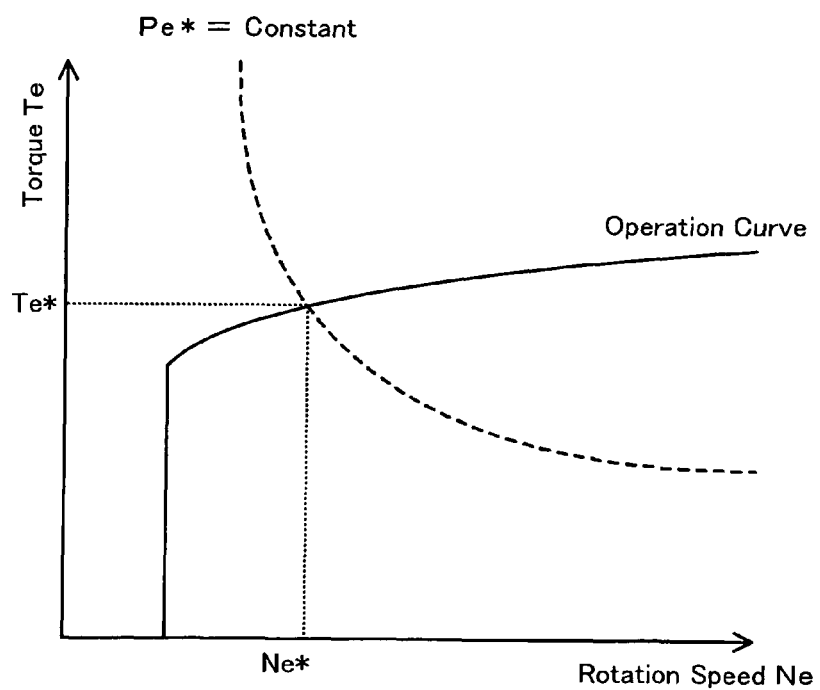
FIG. 7 shows an operation curve of the engine 22 and a correlation curve of a target torque Te* to a target rotation speed Ne*.

After the data input at step S100, the CPU 72 sets a torque demand Tr* to be output to the ring gear shaft 32a or the driveshaft linked with the drive wheels 63a and 63b and a power demand Pe* required for the engine 22, based on the input accelerator opening Acc, the input vehicle speed V, and the input gearshift position SP (step S110). A concrete procedure of setting the torque demand Tr* in this embodiment stores in advance variations in torque demand Tr* against the accelerator opening Acc, the vehicle speed V, and the gearshift position SP as the driving force restriction in the form of a torque demand setting map in the ROM 74 and reads the torque demand Tr* corresponding to the combination of the given accelerator opening Acc, the given vehicle speed V, and the given gearshift position SP from this torque demand setting map. In the accelerator-on state, the driving force restriction gives an identical value to the torque demand Tr* for both the D position and the B position selected as the gearshift position SP. In the accelerator-off state with the accelerator opening Acc=0%, however, the driving force restriction gives different values to the torque demand Tr* (braking torque) between the D position and the B position selected as the gearshift position SP. One example of the torque demand setting map is shown in FIG. 6. The power demand Pe* required for the engine 22 is calculated as the sum of the product of the set torque demand Tr* and a rotation speed Nr (=Nm2/Gr) of the ring gear shaft 32a, the charge-discharge power demand Pb* to be charged into or discharged from the battery 50, and a potential loss. The target rotation speed Ne* and the target torque Te* of the engine 22 are subsequently set based on the power demand Pe* for the engine 22 set at step S110 (step S120). In this embodiment, the target rotation speed Ne* and the target torque Te* defining a target drive point of the engine 22 are determined according to an operation curve of ensuring efficient operation of the engine 22 and a curve of the power demand Pe* at both the D position and the B position selected as the gearshift position SP. FIG. 7 shows an operation curve of the engine 22 and a correlation curve of the target torque Te* to the target rotation speed Ne*. As clearly shown in FIG. 7, the target rotation speed Ne* and the target torque Te* are given as an intersection of the operation curve and the correlation curve of constant power demand Pe* (=Ne*×Te*).

The CPU 72 calculates a target rotation speed Nm1* of the motor MG1 from the target rotation speed Ne* of the engine 22 set at step S120, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S130):

$$Nm1^* = Ne^* \cdot (1+\rho)/\rho - Nm2/(Gr \cdot \rho) \tag{1}$$

$$Tm1^* = \text{Previous } Tm1^* + k1(Nm1^* - Nm1) + k2\int(Nm1^* - Nm1)dt \tag{2}$$

Figure 8:
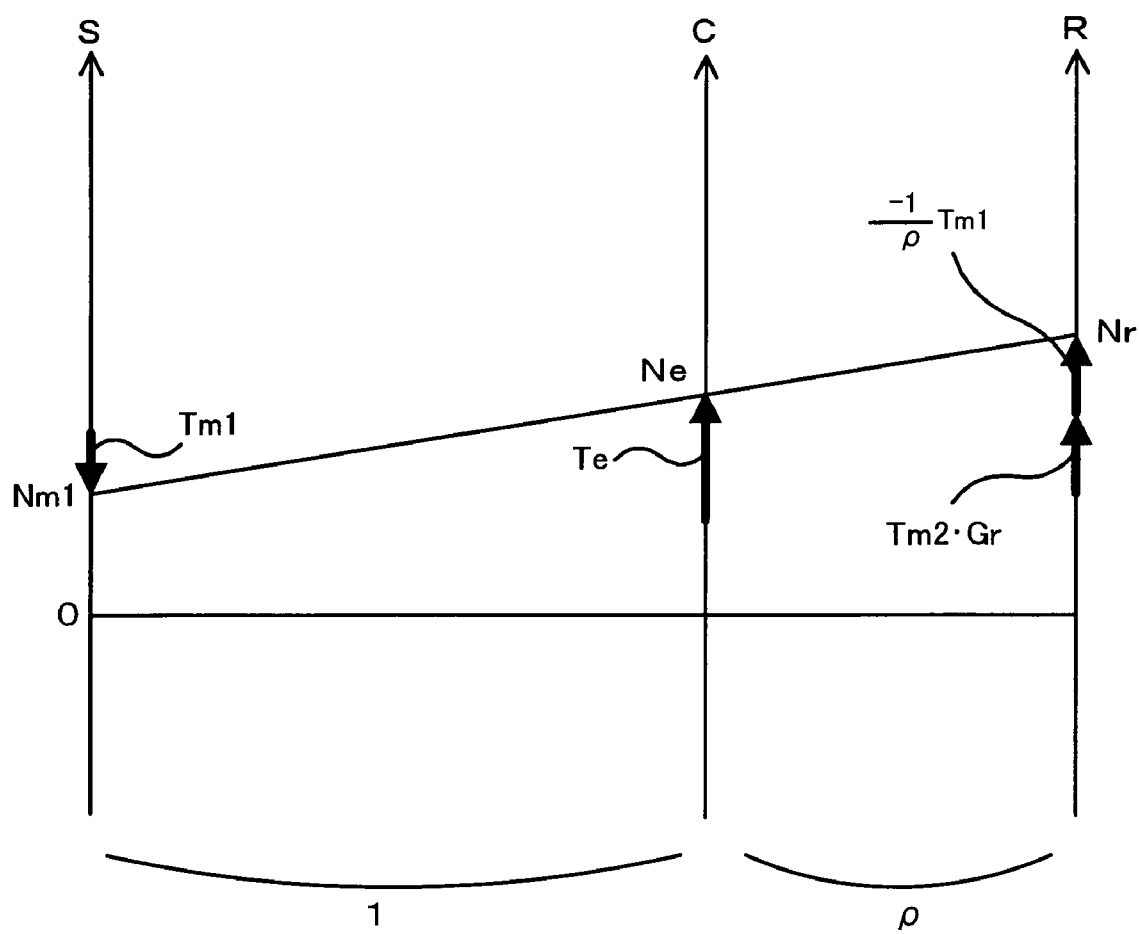
FIG. 8 is an alignment chart showing torque-rotation speed dynamics of respective rotational elements included in a power distribution integration mechanism 30.

Equation (1) is a dynamic relational expression of the rotational elements included in the power distribution integration mechanism 30. FIG. 8 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (1) for calculating the target rotation speed Nm1* of the motor MG1 is readily introduced from the torque-rotation speed dynamics in the alignment chart of FIG. 8. In Equation (1) given above, ρ denotes the gear ratio (the number of teeth of the sun gear 31/the number of teeth of the ring gear 32) of the power distribution integration mechanism 30. In Equation (2) given above, 'k1' in the second term and 'k2' in the third term on the right side respectively denote a gain of the proportional and a gain of the integral term.

The CPU 72 subsequently calculates an upper torque restriction Tmax and a lower torque restriction Tmin as allowable maximum and minimum torques output from the motor MG2 according to Equations (3) and (4) given below (step S140):

$$T\max = (W\text{out} - Tm1^* \cdot Nm1)/Nm2 \tag{3}$$

$$T\min = (W\text{in} - Tm1^* \cdot Nm1)/Nm2 \tag{4}$$

The upper torque restriction Tmax and the lower torque restriction Tmin are obtained by dividing respective differences between the output limit Wout or the input limit Win of the battery 50 input at step S100 and power consumption of the motor MG1, which is the product of the calculated torque command Tm1* and the current rotation speed Nm1 of the motor MG1, by the current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S150):

$$Tm2tmp = (Tr^* + Tm1^*/\rho)/Gr \tag{5}$$

The CPU 72 then limits the calculated tentative motor torque Tm2tmp by the upper and lower torque restrictions Tmax and Tmin to set a torque command Tm2* of the motor MG2 (step S160). Setting the torque command Tm2* of the motor MG2 in this manner basically restricts the torque demand Tr* to be output to the ring gear shaft 32a in the range of the input limit Win and the output limit Wout of the battery 50. Equation (5) is readily introduced from the alignment chart of FIG. 8. After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S170). In response to reception of the settings of the target rotation speed Ne* and the target torque Te*, the engine ECU 24 refers to a fuel injection setting map and a throttle opening setting map (not shown) stored in the ROM 24b to specify a fuel injection amount of the engine 22 and a position (throttle opening) of the throttle valve 124 and performs required controls to gain the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*.

At the vehicle speed V of or over a preset relatively high level in the accelerator-on state with operation of the engine 22, the driver may release the accelerator pedal 83 to make a deceleration request. In this case, the operations of the engine 22 and the motors MG1 and MG2 are controlled to stop the fuel injection to the engine 22 and to satisfy the torque demand Tr* (braking torque) by mainly utilizing the engine brake in the accelerator-off state with the accelerator opening Acc=0% according to the torque demand setting map of FIG. 6. The stop of fuel injection to the engine 22 in the high temperature condition of the exhaust gas purification catalyst in the catalytic converter 134 (for example, at a catalyst bed temperature Tcat of or over 850° C.), only the air flowed through the combustion chamber is supplied to the catalytic converter 134. The exhaust gas purification catalyst in the catalytic converter 134 is then exposed to the lean atmosphere to induce grain growth of the oxidation catalyst and the reduction catalyst. The grain growth lowers the surface area of these catalysts and may cause deterioration of the exhaust gas purification catalyst (lower the ability of the catalytic conversion). In a certain temperature condition (catalyst bed temperature Tcat) of the exhaust gas purification catalyst, a preferable control procedure tentatively prohibits the stop of fuel injection to the engine 22 (hereafter referred to as the 'fuel cutoff') and makes increasing correction of adequately increasing the fuel injection amount to the engine 22 to regulate the catalyst bed temperature Tcat of the exhaust gas purification catalyst. When the driver releases the accelerator pedal 83 to make the deceleration request in the prohibition of the fuel cutoff, the operations of the engine 22 and the motors MG1 and MG2 are controlled to continue the fuel injection and the ignition (firing) to the engine 22 in predetermined conditions. The control simultaneously regulates the throttle opening of the throttle valve 124 to gradually lower the rotation speed of the engine 22 to a preset level (for example, to an idle rotation speed) and causes the motor MG2 to cancel out the torque output from the engine 22 and output the torque demand Tr* (braking torque) at the accelerator opening Acc=0% according to the torque demand setting map of FIG. 6. In this state, the motor MG2 is under regenerative control to generate electric power accompanied with production of the braking force, and the regenerative electric power is accumulated in the battery 50. The regenerative control of the motor MG2 may, however, be limited according to the input limit Win as the allowable charging power of the battery 50. The hybrid vehicle 20 of the embodiment executes catalyst deterioration control as described below to perform the increasing correction of increasing the fuel injection amount to the engine 22 and prevent deterioration of the exhaust gas purification catalyst by taking into account both the catalyst bed temperature Tcat of the exhaust gas purification catalyst in the catalytic converter 134 and the input limit Win of the battery 50.

Figure 9:
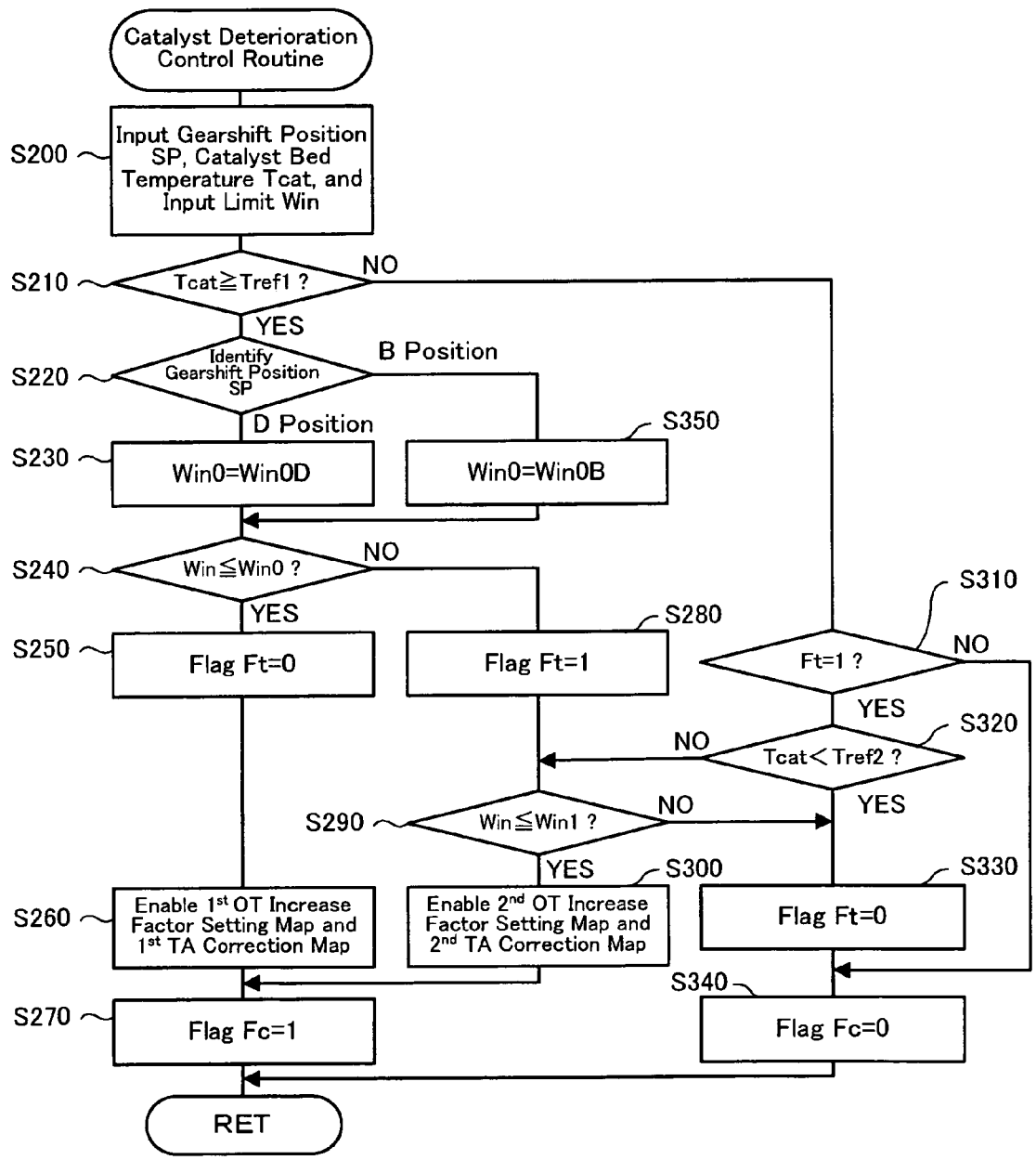
FIG. 9 is a flowchart showing a catalyst deterioration control routine executed by an engine ECU 24 in the first embodiment.

FIG. 9 is a flowchart showing a catalyst deterioration control routine repeatedly performed by the engine ECU 24 at preset time intervals. At the start of the catalyst deterioration control routine of FIG. 9, the CPU 24a of the engine ECU 24 first inputs various data required for the control, that is, the gearshift position SP from the gearshift position sensor 82, the catalyst bed temperature Tcat from a temperature sensor 135 attached to the catalytic converter 134, and the input limit Win of the battery 50 (step S200). The gearshift position SP may be received from the hybrid ECU 70 by communication or may be input directly from the gearshift position sensor 82. The input limit Win of the battery 50 is received from the battery ECU 52 by communication. In the structure without the temperature sensor 135 attached to the catalytic converter 134, the catalyst bed temperature Tcat may be estimated from the rotation speed Ne of the engine 22, the amount of the intake air, and an increment in fuel injection amount (described later). After the data input at step S200; the CPU 24a determines whether the input catalyst bed temperature Tcat is not lower than a preset first reference value Tref1 (step S210). When the catalyst bed temperature Tcat is not lower than the first reference value Tref1 and the exhaust gas purification catalyst is expected to be in the high temperature condition, it is identified whether the input gearshift position SP is either the D position or the B position (step S220). The first reference value Tref1 is set based on a first target catalyst bed temperature T1 (for example, 920° C.) in restriction of the increase of the catalyst bed temperature Tcat to a degree of controlling deterioration of the exhaust gas purification catalyst.

Upon identification of the D position as the input gearshift position SP, the CPU 24a sets a tentative limit value Win0 as a threshold relating to the input limit Win of the battery 50 to a predetermined value Win0D (a negative value) for the D position (step S230) and determines whether the input limit Win of the battery 50 input at step S200 is not higher than the tentative limit value Win0 (equal to Win0D in this case) (step S240). The tentative limit value Win0 (Win0D) is set to be smaller than a threshold limit value (minimum charging power) Win1 of the input limit Win of the battery 50 under the condition that the torque demand (braking torque) required in the accelerator-off state is satisfied by the regenerative braking force of the motor MG2 without the fuel cutoff. Namely the absolute value of the tentative limit value Win0 is set to be greater than the absolute value of the threshold limit value Win1 and include a margin as the charging power. The tentative limit value Win0 and the threshold limit value Win1 are both determined in advance by experiments and analyses. The input limit Win is an intrinsically negative value. The input limit Win of or below the tentative limit value Win0, that is, the absolute value of the input limit Win of or over the absolute value of the tentative limit value Win0 as the charging power, means that a relatively large absolute value is settable as the charging power of the battery 50. When the input limit Win is not higher than the tentative limit value Win0, the CPU 24a sets a tentative prohibition flag Ft to 0 (step S250) and enables a first OT increase factor setting map of FIG. 10($a$) and a first TA correction map (not shown) read from the ROM 24b (step S260). The first OT increase factor setting map is used to set an increase factor for increasing correction of the fuel injection amount to the engine 22, which is determined according to the fuel injection amount setting map as explained previously. The first TA correction map is used to set a correction factor for correction of the throttle opening of the throttle valve 124, which is determined according to the throttle opening setting map as explained previously. The CPU 24a then sets a fuel cutoff prohibition flag Fc to 1 to prohibit the fuel cutoff (step S270) and terminates the catalyst deterioration control routine. The fuel cutoff prohibition flag Fc is reset to 0 to allow the fuel cutoff.

In this state, the catalyst deterioration control routine enables the first OT increase factor setting map and the first TA correction map for setting the increase factor of the fuel injection amount and the correction factor of the throttle opening at step S260 and prohibits the fuel cutoff at step S270. When setting the fuel injection amount to the engine 22 and the throttle opening of the throttle valve 124 based on the target rotation speed Ne* and the target torque Te* as the command values sent from the hybrid ECU 70 and a preset restriction in the prohibition of the fuel cutoff, the engine ECU 24 refers to these maps and performs the increasing correction of the fuel injection amount and the correction of the throttle opening with the set increase factor of the fuel injection amount and the set correction factor of the throttle opening. As shown in FIG. 10($a$), the first OT increase factor setting map specifies the increase factor according to the target rotation speed Ne* of the engine 22 and a volumetric efficiency KL relevant to the amount of the intake air. The first OT increase factor setting map is designed to basically give the larger increase factor against the higher target rotation speed Ne* and the higher volumetric efficiency KL. In this embodiment, the first OT increase factor setting map determines the increase factor of the fuel injection amount corresponding to each combination of the target rotation speed Ne* of the engine 22 and the volumetric efficiency KL, in order to keep the catalyst bed temperature Tcat substantially at the level of the first target catalyst bed temperature T1 and prevent an extreme increase of the catalyst bed temperature Tcat. In the state of enabling the first OT increase factor setting map, there is a relatively small increment in fuel injection amount. This saves the fuel consumption required for temperature regulation to control deterioration of the exhaust gas purification catalyst. The first TA correction map (not shown) specifies the correction factor of the throttle opening according to the target rotation speed Ne* and the target torque Te* to cancel out a difference between the target torque Te* and an actual torque output from the engine 22, which is induced by the increasing correction of the fuel injection amount according to the first OT increase factor setting map. The correction factor of the throttle opening in the first TA correction map is set to increase the throttle opening in a drive range with an increase in torque output by the increased fuel injection amount and to decrease the throttle opening in a drive range with a decrease in torque output by the increased fuel injection amount. Such setting effectively reduces a potential shock ascribed to the difference between the target torque Te* and the actual torque output from the engine 22, which is induced by the increasing correction of the fuel injection amount according to the first OT increase factor setting map.

When it is determined at step S240 that the input limit Win exceeds the tentative limit value Win0, on the other hand, the CPU 24a sets the tentative prohibition flag Ft to 1 (step S280) and determines whether the input limit Win of the battery 50 input at step S200 is not higher than the threshold limit value Win1 (step S290). The tentative prohibition flag Ft is reset to 0 when the input limit Win is not higher than the tentative limit value Win0 as mentioned above. When the input limit Win is not higher than the threshold limit value Win1, that is, when the absolute value of the input limit Win is not lower than the absolute value of the threshold limit value Win1 as the charging power, the CPU 24a enables a second OT increase factor setting map of FIG. 10(b) and a second TA correction map (not shown) read from the ROM 24b (step S300). The second OT increase factor setting map has a greater increase tendency of increasing the fuel injection amount than the first OT increase factor setting map. The first OT increase factor setting map is used to set the increase factor for increasing correction of the fuel injection amount to the engine 22, which is determined according to the fuel injection amount setting map as explained previously. The second TA correction map is used to set the correction factor for correction of the throttle opening of the throttle valve 124, which is determined according to the throttle opening setting map as explained previously. The CPU 24a then sets the fuel cutoff prohibition flag Fc to 1 (step S270) and terminates the catalyst deterioration control routine. When it is determined at step S290 that the input limit Win exceeds the threshold limit value Win1, on the other hand, the CPU 24a resets the tentative prohibition flag Ft to 0 (step S330) and resets the fuel cutoff prohibition flag Fc to 0 to cancel the prohibition of the fuel cutoff according to the state of the battery 50 (step S340).

In this state, the catalyst deterioration control routine enables the second OT increase factor setting map and the second TA correction map for setting the increase factor of the fuel injection amount and the correction factor of the throttle opening at step S300 and prohibits the fuel cutoff at step S270. When setting the fuel injection amount to the engine 22 and the throttle opening of the throttle valve 124 based on the target rotation speed Ne* and the target torque Te* as the command values sent from the hybrid ECU 70 and a preset restriction in the prohibition of the fuel cutoff, the engine ECU 24 refers to these maps and performs the increasing correction of the fuel injection amount and the correction of the throttle opening with the set increase factor of the fuel injection amount and the set correction factor of the throttle opening. As shown in FIG. 10(b), the second OT increase factor setting map specifies the increase factor according to the target rotation speed Ne* of the engine 22 and the volumetric efficiency KL relevant to the amount of the intake air. The second OT increase factor setting map is designed to basically give the larger increase factor against the higher target rotation speed Ne* and the higher volumetric efficiency KL. In this embodiment, the second OT increase factor setting map determines the increase factor of the fuel injection amount corresponding to each combination of the target rotation speed Ne* of the engine 22 and the volumetric efficiency KL, in order to lower the catalyst bed temperature Tcat to a second target catalyst bed temperature T2 (for example, 850° C.) having little fear of deterioration of the exhaust gas purification catalyst even exposed to the lean atmosphere. Namely the second OT increase factor setting map is designed to give the larger increase factor against the relatively low target rotation speed Ne* and the relatively low volumetric efficiency KL, compared with the first OT increase factor setting map. In the state of enabling the second OT increase factor setting map, there is basically a greater increment in fuel injection amount at the higher vehicle speed V, compared with in the state of enabling the first OT increase factor setting map. The second TA correction map (not shown) specifies the correction factor of the throttle opening according to the target rotation speed Ne* and the target torque Te* to cancel out a difference between the target torque Te* and the actual torque output from the engine 22, which is induced by the increasing correction of the fuel injection amount according to the second OT increase factor setting map. Such setting effectively reduces a potential shock ascribed to the difference between the target torque Te* and the actual torque output from the engine 22, which is induced by the increasing correction of the fuel injection amount according to the second OT increase factor setting map.

The tentative limit value Win0D as the threshold for making selection between the first OT increase factor setting map and the second OT increase factor setting map is determined to have a larger absolute value as charging power than the threshold limit value Win1 as explained previously. The tentative limit value Win0D is set in the following manner on the premise of increasing the fuel injection amount according to the second OT increase factor setting map. In this embodiment, the tentative limit value Win0D is obtained by adding the threshold limit value Win1 to the product of a maximum variation ΔWin per unit time of the input limit Win and a minimum time T according to Equation (6) given below:

$$Win0D = Win1 + \Delta Win \cdot T \tag{6}$$

The minimum time T and the maximum variation ΔWin per unit time are both determined by experiments and analyses. The minimum time T represents a minimum possible time period required for the decrease of the catalyst bed temperature Tcat to the second target catalyst bed temperature T2 having little fear of deterioration of the exhaust gas purification catalyst even exposed to the lean atmosphere by increasing the fuel injection amount according to the second OT increase factor setting map when the catalyst bed temperature Tcat is substantially equal to the first target catalyst bed temperature T1 in limitation of the temperature increase to the degree of controlling deterioration of the exhaust gas purification catalyst.

The catalyst bed temperature Tcat is gradually lowered as the result of setting the tentative prohibition flag Ft to 1 at step S280 and enabling the second OT increase factor setting map at step S300. In a subsequent cycle of the catalyst deterioration control routine, the catalyst bed temperature Tcat input at step S200 may be determined to be lower than the first reference value Tref1 at step S210. At the catalyst bed temperature Tcat below the first reference value Tref1, the CPU 24a identifies whether the tentative prohibition flag Ft is equal to 1 (step S310). Upon identification of the tentative prohibition flag Ft equal to 1, the CPU 24a determines whether the input catalyst bed temperature Tcat is lower than a second reference value Tref2, which is set based on the second target catalyst bed temperature T2 (step S320). At the catalyst bed temperature Tcat of or over the second reference value Tref2, the CPU 24a determines whether the input limit Win is not higher than the threshold limit value Win1 (step S290). When the input limit Win is not higher than the threshold limit value Win1, the CPU 24a enables the second OT increase factor setting map and the second TA correction map read from the ROM 24b (step S300) and sets the fuel cutoff prohibition flag Fc to 1 to prohibit the fuel cutoff (step S270), before terminating the catalyst deterioration control routine. When the input limit Win exceeds the threshold limit value Win1, on the other hand, the CPU 24a resets the tentative prohibition flag Ft to 0 (step S330) and resets the fuel cutoff prohibition flag Fc to 0 to cancel the prohibition of the fuel cutoff according to the state of the battery 50 (step S340). At the catalyst bed temperature Tcat below the second reference value Tref2, it is assumed that the catalyst bed temperature Tcat has already been lowered to the second target catalyst bed temperature T2 having little fear of deterioration of the exhaust gas purification catalyst even exposed to the lean atmosphere. The CPU 24a accordingly resets the tentative prohibition flag Ft to 0 (step S330) and resets the fuel cutoff prohibition flag Fc to 0 to cancel the prohibition of the fuel cutoff according to the state of the battery 50 (step S340). Upon identification of the tentative prohibition flag Ft equal to 0 at step S310, the catalyst bed temperature Tcat is in a relatively low temperature range without the increasing correction of the fuel injection amount according to the second OT increase factor setting map. In this case, there is little potential for deteriorating the exhaust gas purification catalyst even in the fuel cutoff condition. The fuel cutoff prohibition flag Fc is thus reset to 0 (step S340).

FIG. 11 is a time chart showing a variation in input limit Win, a time change of the catalyst bed temperature Tcat, and the settings of the increase factor, the fuel cutoff prohibition flag Fc, and the tentative prohibition flag Ft during execution of the series of processing described above. The input limit Win is not actually varied with elapse of time but is shown to have a time change for the simplicity of explanation. As clearly shown in the time chart of FIG. 11, in a high temperature condition of the exhaust gas purification catalyst (Tcat≧Tref1), the first OT increase factor setting map is enabled according to the state of the battery 50. The increasing correction of the fuel injection amount to the engine 22 is performed according to the enabled first OT increase factor setting map to keep the catalyst bed temperature Tcat substantially at the level of the first target catalyst bed temperature T1. Under the conditions that the exhaust gas purification catalyst is in a specific temperature range (for example, a temperature range of exceeding 850° C.) and that the input limit Win of the battery 50 is in a range from the tentative limit value Win0 to the threshold limit value Win1, the tentative prohibition flag Ft is set to 1 and the second OT increase factor setting map is enabled. The increasing correction of the fuel injection amount to the engine 22 is performed according to the enabled second OT increase factor setting map to lower the catalyst bed temperature Tcat substantially to the second target catalyst bed temperature T2. The increment in fuel injection amount to the engine 22 is enhanced at the time when the input limit Win is relatively close to the threshold limit value Win1 (that is, when the absolute value of the input limit Win decreases below the absolute value of the tentative limit value Win0 as the charging power). This enables temperature regulation of the exhaust gas purification catalyst, with a view to controlling deterioration of the exhaust gas purification catalyst in the actual fuel cutoff condition after cancellation of the prohibition of the fuel cutoff based on the input limit Win. The fuel cutoff prohibition flag Fc is set to 1 when the catalyst bed temperature Tcat is in the specific temperature range and when the input limit Win is not higher than the threshold limit value Win1 (that is, when the absolute value of the input limit Win is not lower than the absolute value of the threshold limit value Win1 as the charging power). When the input limit Win exceeds the threshold limit value Win1 (that is, when the absolute value of the input limit Win decreases below the absolute value of the threshold limit value Win1 as the charging power), the braking force in the accelerator-off state with continuation of the fuel injection to the engine 22 is not satisfied by the regenerative braking force of the motor MG2. In this case, the fuel cutoff prohibition flag Fc is reset to 0 to cancel the prohibition of the fuel cutoff.

As clearly shown in FIG. 6, the B position selected, for example, during relatively high-speed downhill driving sets a larger driving force demand in the accelerator-off state, compared with the D position selected during ordinary driving. At the B position selected as the gearshift position SP, the torque demand Tr* set in the accelerator-off state with the accelerator opening Acc=0% has a smaller value to give a greater braking force than the value at the D position selected as the gearshift position SP. At the B position, in response to a deceleration request by the driver's accelerator-off operation in the prohibition of the fuel cutoff, while the fuel injection to the engine 22 is continued, the motor MG2 is controlled to cancel out the output torque of the engine 22 and output the torque demand Tr* (braking torque) at the accelerator opening Acc of 0%. The motor MG2 has the greater regenerative electric power at the B position than the regenerative electric power at the D position. This increases the potential for failed accumulation of the regenerative electric power in the battery 50 at the B position. In this case, a smaller absolute value is set to the input limit Win as the charging power based on the relation to the state of charge SOC of the battery 50. The absolute value of the input limit Win has the greater decrease tendency to decrease below the absolute value of the threshold limit value Win1 as the charging power at the B position than the tendency at the D position. There is accordingly a high potential for canceling the prohibition of the fuel cutoff based on such a decrease in absolute value of the input limit Win, regardless of the high temperature condition of the exhaust gas purification catalyst.

In the hybrid vehicle 20 of the embodiment, in the high temperature condition of the exhaust gas purification catalyst defined by the catalyst bed temperature Tcat of or over the first reference value Tref1 at step S210 and upon identification of the B position as the gearshift position SP at step S220, the CPU 24a sets the tentative limit value Win0 to Win0B having a greater absolute value as the charging power than Win0D set at the D position (Win0B<Win0D≦0, |Win0B|>|Win0D|) (step S350) and subsequently executes the processing of and after step S240. When the input limit Win exceeds the tentative limit value Win0 (Win0B) at step S240, the tentative prohibition flag Ft is set to 1 (step S280). When the subsequent comparison shows the input limit Win of or below the threshold limit value Win1 (step S290), the second OT increase factor setting map and the second TA correction map are enabled (step S300). When the comparison shows the input limit Win over the threshold limit value Win1, on the other hand, the fuel cutoff prohibition flag Fc is reset to 0 to cancel the prohibition of the fuel cutoff (step S340). At the B position, the increasing correction of the fuel injection amount according to the second OT increase factor setting map starts at the stage having a greater margin in input limit Win of the battery 50 as shown by the two-dot chain line in FIG. 11, compared with the increasing correction at the D position shown by the one-dot chain line in FIG. 11. This increasing correction at the B position aims to lower the catalyst bed temperature Tcat to the second target catalyst bed temperature T2 having little fear of deteriorating the exhaust gas purification catalyst even exposed to the lean atmosphere.

As described above, in the hybrid vehicle 20 of the embodiment, the tentative limit value Win0 is set suitably for the current gearshift position SP selected among the multiple options, which are correlated to the operating conditions specifying the driving force restriction of setting the torque demand Tr* required for driving and the drive point restriction of setting the drive point of the engine 22 corresponding to the torque demand Tr*. The setting of the tentative limit value Win0 determines the relation of the input limit Win as the allowable charging power of the battery 50 to the selection between the first and the second OT increase factor setting maps adopted as the first and second increase restrictions of the fuel injection amount to the engine 22 for regulation of the catalyst bed temperature Tcat of the exhaust gas purification catalyst. In the state of prohibition of the fuel cutoff (including the accelerator-on time and the time of continued fuel injection) according to the result of determination based on the input limit Win, the control procedure sets the torque demand Tr* required for driving and the target rotation speed Ne* and the target torque Te* defining the target drive point of the engine 22 with regard to the selected gearshift position SP. The control procedure then controls the operations of the engine 22 and the motors MG1 and MG2 to drive the engine 22 at the set target drive point and to ensure output of a driving force (braking force) for satisfying the set torque demand Tr*, accompanied with the increasing correction of the fuel injection amount according to either the first OT increase factor setting map or the second OT increase factor setting map enabled based on the relation of the input limit Win to the tentative limit value Win0 (Win0D or Win0B). After setting the tentative limit value Win0 that affects the increasing correction of the fuel injection amount at the selected gearshift position SP as the operating condition set for driving, the increasing correction of the fuel injection amount is performed according to either the first OT increase factor setting map or the second OT increase factor setting map, which is enabled based on the relation of the input limit Win as the allowable charging power to the tentative limit value Win0. The prohibition of the fuel cutoff may be cancelled, based on the relation of the input limit Win to the driving force demand (braking force demand) set at the selected gearshift position SP. Even in this case, the increasing correction enables temperature regulation of the exhaust gas purification catalyst, with a view to controlling deterioration of the exhaust gas purification catalyst in the actual fuel cutoff condition after cancellation of the prohibition of the fuel cutoff. The deterioration of the exhaust gas purification catalyst is thus favorably controlled, irrespective of the gearshift position SP selected as the operating condition set for driving.

The hybrid vehicle 20 detects requirement for prohibition of the fuel cutoff under the conditions that the catalyst bed temperature Tcat is in the specific temperature range (for example, in the temperature range of exceeding 850° C.) and that the input limit Win is not higher than the threshold limit value Win1 (that is, the absolute value of the input limit Win is not lower than the absolute value of the threshold limit value Win1 as the charging power). The increasing correction of the fuel injection amount in the prohibition of the fuel cutoff is performed according to the first OT increase factor setting map as the first increase restriction until satisfaction of a transition condition regarding the relation of the input limit Win to the tentative limit value Win0 having a larger absolute value than the absolute value of the threshold limit value Win1 as the charging power. Upon satisfaction of the transition condition, the second OT increase factor setting map is adopted for the increasing correction. The second OT increase factor setting map has the tendency of allowing a greater increment in fuel injection amount, compared with the first OT increase factor setting map. The transition condition is changed corresponding to the gearshift position SP selected for driving. Upon satisfaction of the transition condition, the greater value is set to the increment in fuel injection amount to the engine 22 according to the second OT increase factor setting map as the second increase restriction. This ensures the adequate increasing correction of the fuel injection amount for temperature regulation of the exhaust gas purification catalyst or more specifically for the accelerated temperature decrease of the exhaust gas purification catalyst in the limitations of the gearshift position SP and the input limit Win of the battery 50. The B position has a smaller lower limit of the power range and sets a relatively large braking force in the accelerator-off state, compared with the D position. On selection of the B position, the increasing correction of the fuel injection amount to the engine 22 starts at the stage having a greater margin of the input limit Win by setting a greater value to the tentative limit value Win0. There is a fear of canceling the prohibition of the fuel cutoff, based on the relation of the input limit Win to the driving force demand (braking force demand) set at the B position. Even in this case, such increasing correction sufficiently lowers the temperature of the exhaust gas purification catalyst to prevent deterioration of the exhaust gas purification catalyst in the actual fuel cutoff condition after cancellation of the prohibition of the fuel cutoff.

Figure 12:
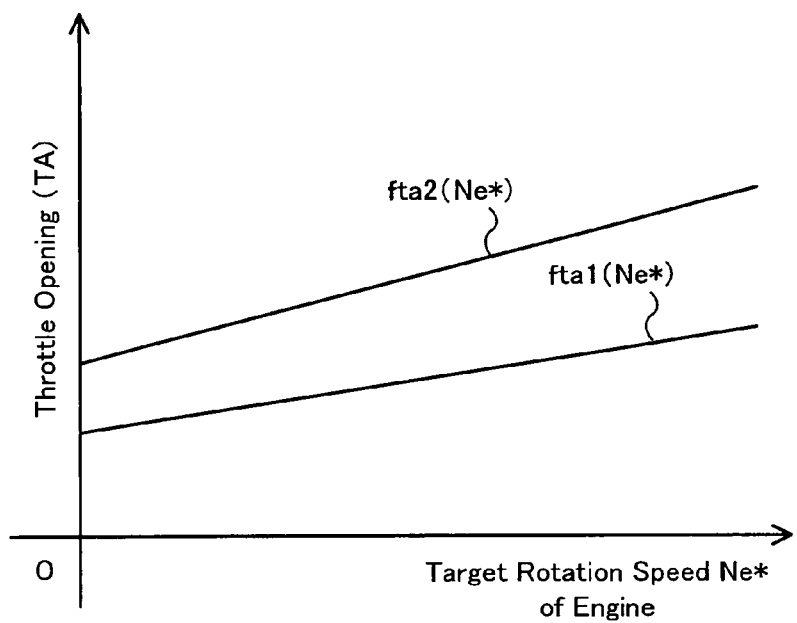
FIG. 12 shows a first throttle opening setting map and a second throttle opening setting map.

In the hybrid vehicle 20 of the embodiment, in some condition of the input limit Win as the allowable charging power of the battery 50, before the sufficient increasing correction of the fuel injection amount according to either the first OT increase factor setting map or the second OT increase factor setting map, the fuel cutoff prohibition flag Fc may be reset to 0 to cancel the prohibition of the fuel cutoff in response to determination that the input limit Win exceeds the threshold limit value Win1 at step S290. In such cases, the exhaust gas purification catalyst in the relatively high temperature condition may be exposed to the lean atmosphere. In the accelerator-off state with the setting of the fuel cutoff prohibition flag Fc to 0 according to the catalyst deterioration control routine of FIG. 9, when the catalyst bed temperature Tcat is lower than the second reference value Tref2 set based on the second target catalyst bed temperature T2, the operations of the engine 22 and the motors MG1 and MG2 are preferably controlled to drive the engine 22 in the fuel cutoff condition with setting of the amount of the intake air according to a first throttle opening setting map fta1(Ne*) for ordinary driving as a first restriction of specifying the throttle opening corresponding to the target rotation speed Ne* of the engine 22 as shown in FIG. 12 and to ensure output of the set torque demand Tr*. When the catalyst bed temperature Tcat is not lower than the second reference value Tref2, on the other hand, the operations of the engine 22 and the motors MG1 and MG2 are preferably controlled to drive the engine 22 in the fuel cutoff condition with setting of the amount of the intake air according to a second throttle opening setting map fta2(Ne*) as a second restriction shown in FIG. 12 and to ensure output of the set torque demand Tr*. The second throttle opening setting map fta2(Ne*) has the tendency of increasing the amount of the intake air, compared with the first throttle opening setting map fta1(Ne*) for ordinary driving. In the case of an insufficient increment in fuel injection amount to control deterioration of the exhaust gas purification catalyst, the increased throttle opening enables a relatively large quantity of the air to be supplied to the catalytic converter 134. This effectively prevents an extreme temperature increase of the exhaust gas purification catalyst and thereby controls deterioration of the exhaust gas purification catalyst.

Figure 13:
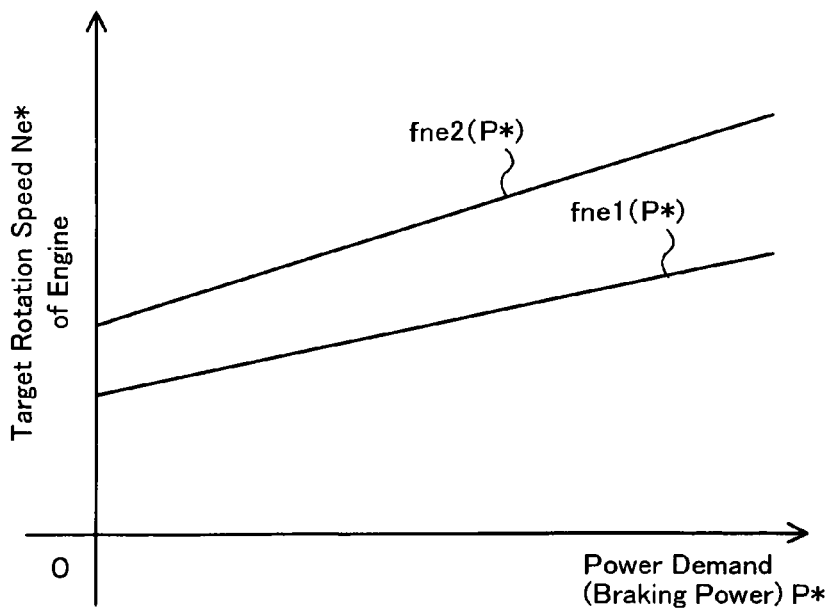
FIG. 13 shows a first target rotation speed setting map and a second target rotation speed setting map.

In the accelerator-off state with the setting of the fuel cutoff prohibition flag Fc to 0 according to the catalyst deterioration control routine of FIG. 9, the target rotation speed Ne* of the engine 22 may be set by the following procedure, in addition to the setting of the amount of the intake air explained above. In the accelerator-off state with the setting of the fuel cutoff prohibition flag Fc to 0 according to the catalyst deterioration control routine of FIG. 9, when the catalyst bed temperature Tcat is lower than the second reference value Tref2, in addition to setting of the amount of the intake air according to the first throttle opening setting map fta1(Ne*) for ordinary driving as shown in FIG. 12, the target rotation speed Ne* of the engine 22 may be set according to a first target rotation speed setting map fne1(P*) for ordinary driving as a first drive point restriction of specifying the target rotation speed Ne* of the engine 22 corresponding to a power demand P* required for the vehicle as shown in FIG. 13. The power demand P* is obtained as the sum of the product of the torque demand Tr* in the accelerator-off state and the rotation speed Nr (=Nm2/Gr) of the ring gear shaft 32a, the charge-discharge power demand Pb* to be charged in or discharged from the battery 50, and a potential loss. When the catalyst bed temperature Tcat is not lower than the second reference value Tref2, on the other hand, in addition to setting of the amount of the intake air according to the second throttle opening setting map fta2(Ne*) as shown in FIG. 12, the target rotation speed Ne* of the engine 22 may be set according to a second target rotation speed setting map fne2(P*) as a second drive point restriction shown in FIG. 13. The second target rotation speed setting map fne2(P*) has the tendency of increasing the target rotation speed Ne* of the engine 22, compared with the first target rotation speed setting map fne1(P*). In the case of an insufficient increment in fuel injection amount to control deterioration of the exhaust gas purification catalyst, the increased throttle opening and the enhanced rotation speed of the engine 22 enable a larger quantity of the air to be supplied to the catalytic converter 134. This more effectively prevents an extreme temperature increase of the exhaust gas purification catalyst and thereby controls deterioration of the exhaust gas purification catalyst.

Figure 14:
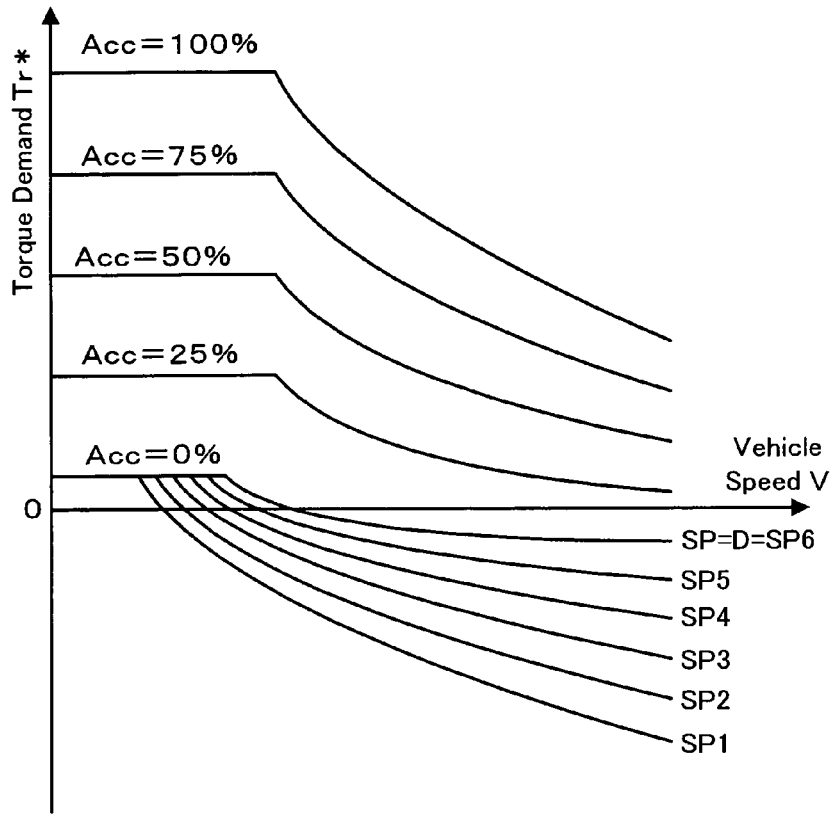
FIG. 14 shows a torque demand setting map in a second embodiment according to the invention.
Figure 15:
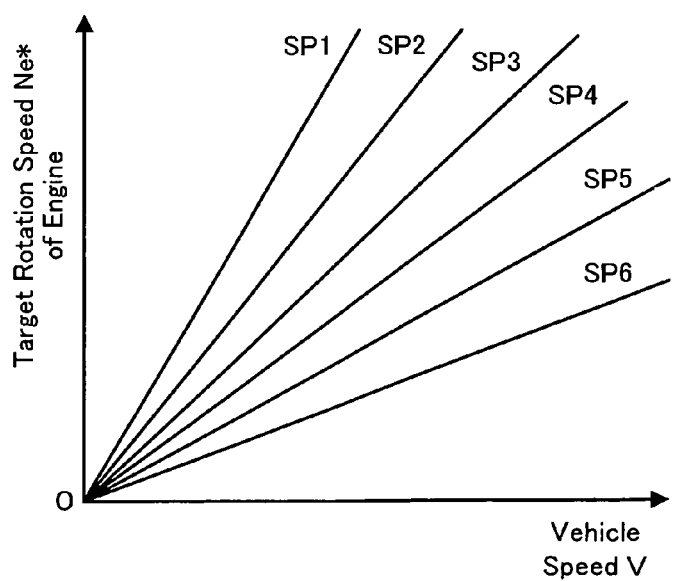
FIG. 15 shows a target rotation speed setting map adopted on selection of an S position in the second embodiment.

The following describes a hybrid vehicle 20B as a second embodiment according to the invention. The hybrid vehicle 20B of the second embodiment basically has the same hardware configuration as that of the hybrid vehicle 20 of the first embodiment, except some differences explained below. The like constituents in the hybrid vehicle 20B of the second embodiment are represented by the like numerals and symbols to those in the hybrid vehicle 20 of the first embodiment and are not specifically described here. As the difference from the configuration of the hybrid vehicle 20 of the first embodiment, the hybrid vehicle 20B of the second embodiment provides a sequential gearshift position (S position), an upshift instruction position, and a downshift instruction position, in addition to the parking position for parking, the reverse position for reverse driving, the neutral position, and the conventional drive position (D position) for forward driving, as the available options of the gearshift position SP of the gearshift lever 81. On selection of the S position as the gearshift position SP, the ratio of the rotation speed of the engine 22 to the vehicle speed V is changeable, for example, among six different speeds SP1 to SP6. In this embodiment, in response to the driver's operation of the gearshift lever 81 to the S position, the gearshift position SP is set to the fifth speed SP5 among the six speeds of the S position. The gearshift position sensor 82 then detects the setting of the gearshift position SP=SP5. At the driver's subsequent operation of the gearshift lever 81 to the upshift instruction position, the gearshift position SP is shifted up by one speed (upshift). At the driver's subsequent operation of the gearshift lever 81 to the downshift instruction position, the gearshift position SP is shifted down by one speed (downshift). The gearshift position sensor 82 detects and outputs the current setting of the gearshift position SP in response to the driver's operation of the gearshift lever 81. In the hybrid vehicle 20B of the second embodiment, a torque demand setting map of FIG. 14 is used as the driving force restriction to set the torque demand Tr*. The torque demand setting map of FIG. 14 is designed to decrease the torque demand Tr* (increase the braking torque) in the accelerator-off state with the accelerator opening Acc=0% at a fixed vehicle speed V in a descending order of the gearshift position SP from the sixth speed SP6 (=D position) to the first speed SP1. In the hybrid vehicle 20B of the second embodiment, the target rotation speed Ne* of the engine 22 at the S position is set corresponding to the gearshift position SP and the vehicle speed V by referring to a target rotation speed setting map as the drive point restriction of the engine 22 as shown in FIG. 15. The target rotation speed setting map of FIG. 15 specifies the target rotation speed Ne* of the engine 22 against the vehicle speed V with regard to the gearshift position SP changeable among the six different speeds SP1 to SP6. The torque demand setting map and the target rotation speed setting map adopted at the S position are prepared in advance and are stored in the ROM 74.

Figure 16:
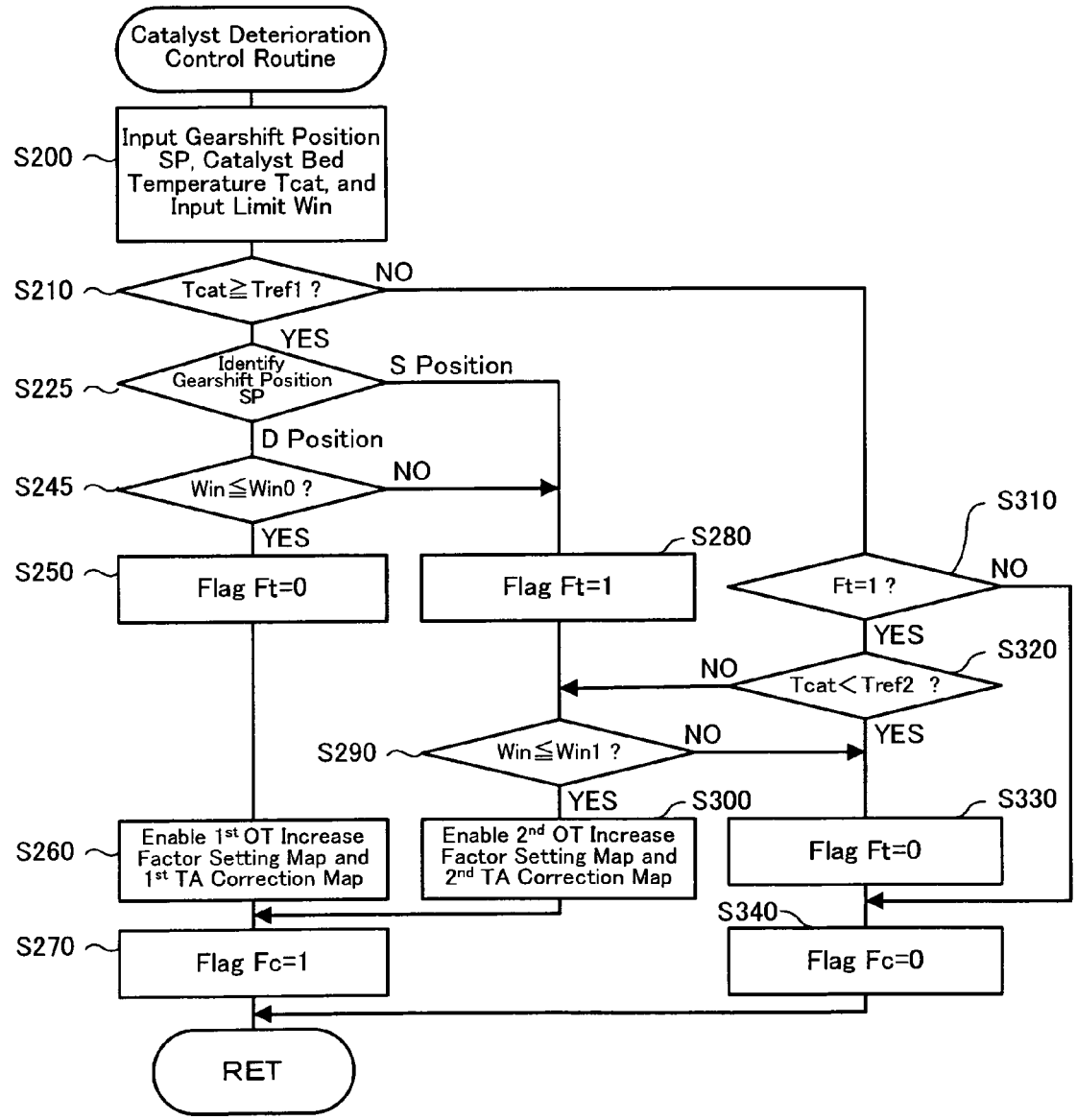
FIG. 16 is a flowchart showing a catalyst deterioration control routine executed by the engine ECU 24 in the second embodiment.

In the hybrid vehicle 20B of this configuration, in response to the driver's upshift operation or downshift operation of the gearshift lever 81, the torque output from the motor MG1 is regulated to vary the rotation speed of the engine 22. Such torque regulation enables the driver to have the sense of drive similar to the change speed in a vehicle equipped with a conventional step automatic transmission. The speed at the S position is arbitrarily selectable among the six different speeds SP1 to SP6 by the driver. As clearly shown in FIG. 14, larger values are set to the braking force demand in the accelerator-off state at the first to the fifth speeds SP1 to SP5 of the S position than the braking force demand at the D position set for ordinary driving. In response to the driver's downshift operation after selection of the S position as the gearshift position SP, the torque demand Tr* in the accelerator-off state with the accelerator opening Acc=0% is decreased to increase the braking force, compared with the torque demand Tr* set at the D position. At the first to the fifth speeds SP1 to SP5 of the S position, in response to a deceleration request by the driver's accelerator-off operation in the prohibition of the fuel cutoff, while the fuel injection to the engine 22 is continued, the motor MG2 is controlled to cancel out the output torque of the engine 22 and output the torque demand Tr* (braking torque) at the accelerator opening Acc of 0%. The motor MG2 has the greater regenerative electric power at the S position than the regenerative electric power at the D position. This increases the potential for failed accumulation of the regenerative electric power in the battery 50 at the S position. In this case, a smaller absolute value is set to the input limit Win as the charging power based on the relation to the state of charge SOC of the battery 50. The absolute value of the input limit Win has the greater decrease tendency to decrease below the absolute value of the threshold limit value Win1 as the charging power at the S position than at the D position. There is accordingly a high potential for canceling the prohibition of the fuel cutoff based on such a decrease in absolute value of the input limit Win, regardless of the high temperature condition of the exhaust gas purification catalyst. In the hybrid vehicle 20B of the second embodiment, the engine ECU 24 executes a catalyst deterioration control routine of FIG. 16, instead of the catalyst deterioration control routine of FIG. 9 executed in the first embodiment. The catalyst deterioration control routine of FIG. 16 is performed repeatedly at preset time intervals. The same processing steps in the catalyst deterioration control routine of FIG. 16 as those in the catalyst deterioration control routine are represented by the same step numbers and are not specifically explained here.

At the start of the catalyst deterioration control routine of FIG. 16, the CPU 24a of the engine ECU 24 inputs the required data for control (step S200) and determines whether the input catalyst bed temperature Tcat is not lower than the first reference value Tref1 (step S210). When the catalyst bed temperature Tcat is not lower than the first reference value Tref1 and the exhaust gas purification catalyst is expected to be in the high temperature condition, it is identified whether the gearshift position SP input at step S200 is either the D position or the S position (including the speeds SP1 to SP5) (step S225). Upon identification of the D position as the gearshift position SP, it is determined whether the input limit Win of the battery 50 input at step S200 is not higher than the tentative limit value Win0 (=Win0D) (step S245). In response to the result of comparison showing the input limit Win of or below the tentative limit value Win0 (=Win0D), the processing of steps S250 to S270 is performed. In response to the result of comparison showing the input limit Win over the tentative limit value Win0 (=Win0D), on the other hand, the processing of and after step S280 is performed. Upon identification of the S position (SP1 to SP5) as the gearshift position SP, the CPU 24a immediately sets the tentative prohibition flag Ft to 1 (step S280) and compares the input limit Win with the threshold limit value Win1 (step S290). In response to the result of comparison showing the input limit Win of or below the threshold limit value Win1, the second OT increase factor setting map and the second TA correction map are enabled (step S300). The subsequent processing is basically identical with that in the catalyst deterioration control routine of FIG. 9 described previously.

In response to the driver's operation of the gearshift lever 81 to the S position allowing selection among the multiple different speeds SP1 to SP5 or in response to the driver's upshift or downshift operation to any of the speeds SP1 to SP5, the second OT increase factor setting map is adopted for the increasing correction of the fuel injection amount to the engine 22. The prohibition of the fuel cutoff may be cancelled, based on the relation of the input limit Win to the driving force demand set to a relatively large braking force at the currently setting gearshift position SP or the subsequently selected speed of the S position. Even in this case, the increasing correction enables temperature regulation of the exhaust gas purification catalyst, with a view to controlling deterioration of the exhaust gas purification catalyst in the actual fuel cutoff condition after cancellation of the prohibition of the fuel cutoff based on the input limit Win. In the hybrid vehicle 20B of the second embodiment, in some condition of the input limit Win as the allowable charging power of the battery 50, before the sufficient increasing correction of the fuel injection amount according to either the first OT increase factor setting map or the second OT increase factor setting map, the fuel cutoff prohibition flag Fc may be reset to 0 to cancel the prohibition of the fuel cutoff in response to determination that the input limit Win exceeds the threshold limit value Win1 at step S290. In the accelerator-off state with the setting of the fuel cutoff prohibition flag Fc to 0 according to the catalyst deterioration control routine of FIG. 16, when the catalyst bed temperature Tcat is lower than the second reference value Tref2 set based on the second target catalyst bed temperature T2, the operations of the engine 22 and the motors MG1 and MG2 are preferably controlled to drive the engine 22 in the fuel cutoff condition with setting of the amount of the intake air according to the first throttle opening setting map fta1(Ne*) for ordinary driving shown in FIG. 12 and to ensure output of the set torque demand Tr*. When the catalyst bed temperature Tcat is not lower than the second reference value Tref2, on the other hand, the operations of the engine 22 and the motors MG1 and MG2 are preferably controlled to drive the engine 22 in the fuel cutoff condition with setting of the amount of the intake air according to the second throttle opening setting map fta2(Ne*) shown in FIG. 12 and to ensure output of the set torque demand Tr*. As explained previously, the second throttle opening setting map fta2(Ne*) has the tendency of increasing the amount of the intake air, compared with the first throttle opening setting map fta1(Ne*) for ordinary driving. In the case of an insufficient increment in fuel injection amount to control deterioration of the exhaust gas purification catalyst, the increased throttle opening enables a relatively large quantity of the air to be supplied to the catalytic converter 134. This effectively prevents an extreme temperature increase of the exhaust gas purification catalyst and thereby controls deterioration of the exhaust gas purification catalyst.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

In the hybrid vehicle 20 of the embodiment, the ring gear shaft 32a as the driveshaft is linked with the motor MG2 via the reduction gear 35 of reducing the rotation speed of the motor MG2 and transmitting the reduced rotation speed to the ring gear shaft 32a. The reduction gear 35 is, however, not essential but may be replaced by a transmission that has two different speeds, Hi and Lo, or three or more different speeds to change the rotation speed of the motor MG2 and transmit the changed rotation speed to the ring gear shaft 32a.

Figure 17:
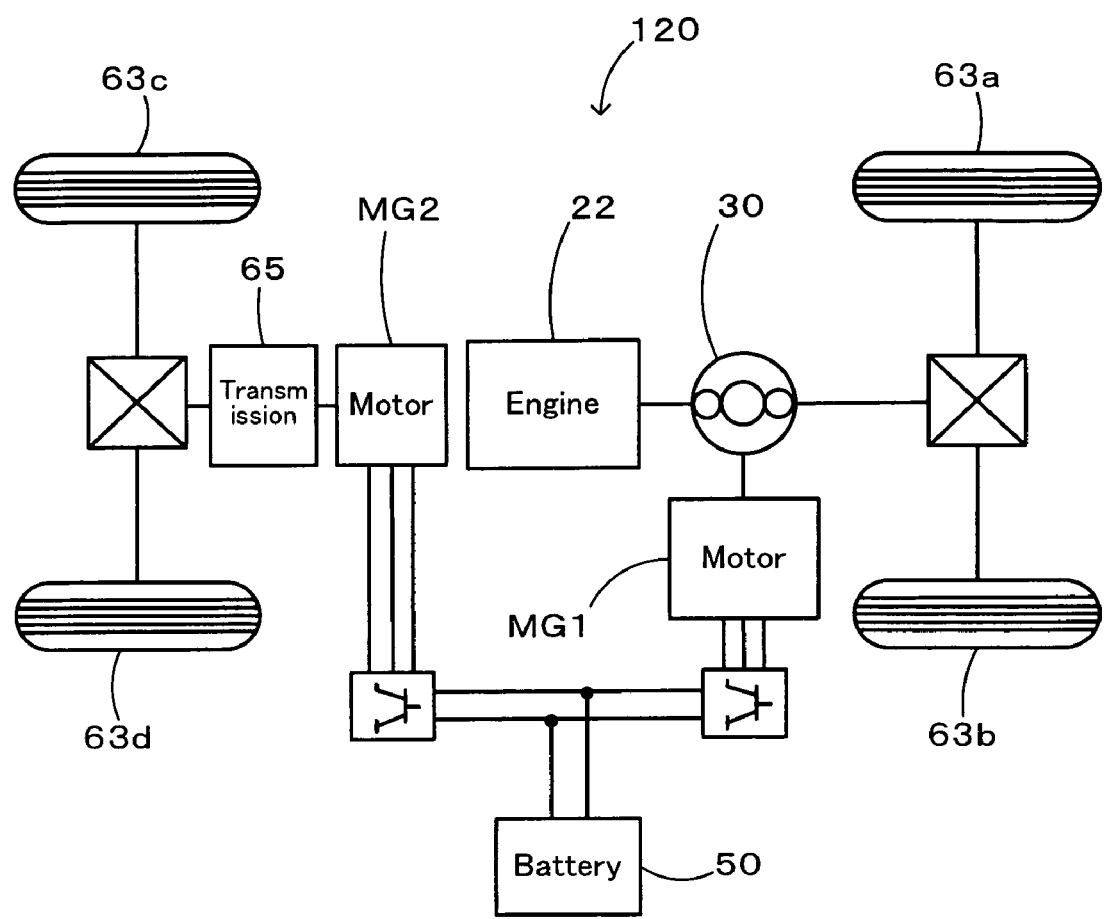
FIG. 17 schematically illustrates the configuration of another hybrid vehicle 120 in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 17, the power of the motor MG2 may be output to another axle (that is, an axle linked with wheels 63c and 63d in FIG. 17), which is different from an axle connected with the ring gear shaft 32a (that is, an axle linked with the wheels 63a and 63b).

Figure 18:
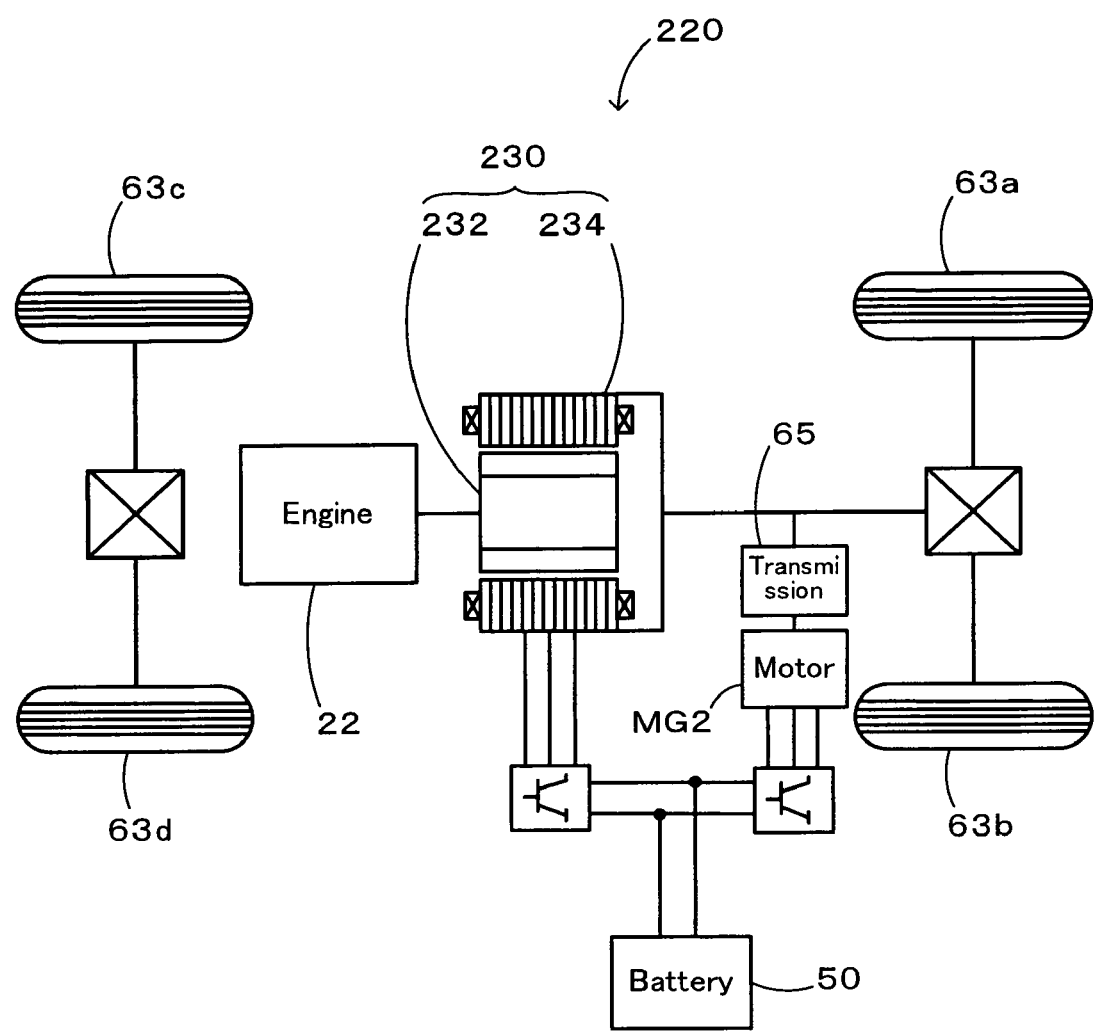
FIG. 18 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 18, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

INDUSTRIAL APPLICABILITY

The present invention can be used in the manufacturing industries of an automobile.

The invention claimed is:

1. A hybrid vehicle, comprising:
   an internal combustion engine;
   a catalytic converter including a catalyst for purification of an exhaust gas emitted from the internal combustion engine;
   an electric power-mechanical power input output assembly connected with a first axle as one of axles of the hybrid vehicle and with an output shaft of the internal combustion engine and configured to input and output power from and to the first axle and the output shaft through input and output of electric power and mechanical power;
   a motor configured to input and output power from and to either the first axle or a second axle different from the first axle;
   an accumulator configured to transmit electric power to and from the electric power-mechanical power input output assembly and the motor;
   an allowable charging power setting module configured to set an allowable charging power to charge the accumulator based on a state of the accumulator;
   a fuel cutoff determination module configured to determine prohibition or permission for cutoff of fuel supply to the internal combustion engine, based on the set allowable charging power;
   an operating condition setting module configured to set an object operating condition selected among multiple operating conditions that define different specifications of a driving force restriction of setting a driving force demand required for driving and a drive point restriction of setting a target drive point of the internal combustion engine corresponding to the set driving force demand;
   a driving force-drive point setting module configured to set the driving force demand and the target drive point of the internal combustion engine based on the selected object operating condition;
   a fuel increase relation setting module configured to set a fuel increase relation based on the selected object operating condition, the fuel increase relation representing a relation between the allowable charging power and an increase restriction of a fuel supply amount to the internal combustion engine for temperature regulation of the catalyst; and
   a controller configured to control the internal combustion engine, the electric power-mechanical power input output assembly, and the motor to drive the internal combustion engine at the set target drive point with an increase of the fuel supply amount according to the increase restriction defined by the set allowable charging power and the set fuel increase relation in response to a result of the determination by the fuel cutoff determination module and to ensure output of a driving force based on the set driving force demand.

2. The hybrid vehicle in accordance with claim 1, the hybrid vehicle further including:
   a catalyst temperature detector configured to detect a temperature of the catalyst,
   wherein the fuel cutoff determination module determines prohibition of the cutoff of the fuel supply, when the detected temperature of the catalyst is within a predetermined temperature range and when the set allowable charging power is not lower than a predetermined threshold limit value as charging power,
   the fuel increase relation enables a first increase restriction until satisfaction of a transition condition regarding a relation between the allowable charging power and a tentative limit value that is greater than the threshold limit value as charging power, while enabling a second increase restriction, which has a greater increase tendency of increasing the fuel supply amount than the first increase restriction, upon satisfaction of the transition condition, and
   the fuel increase relation setting module changes the transition condition corresponding to the set object operating condition, so as to set the fuel increase relation suitable for the object operating condition.

3. The hybrid vehicle in accordance with claim 2, wherein the multiple operating conditions include a first operating condition and a second operating condition having a driving force restriction with a smaller lower limit of a power range than a driving force restriction of the first operating condition,
   the transition condition is satisfied when the allowable charging power decreases below the tentative limit value as charging power, and
   the fuel increase relation setting module sets the tentative limit value to a first tentative limit value in response to setting of the first operating condition as the object operating condition, while setting the tentative limit value to a second tentative limit value, which is greater than the first tentative limit value as charging power, in response to setting of the second operating condition as the object operating condition.

4. The hybrid vehicle in accordance with claim 3, wherein the operating condition setting module includes a gearshift position setting module configured to set an object gearshift position among multiple gearshift positions in response to a driver's gearshift operation, and
   the first operating condition is correlated to a drive position set for ordinary driving among the multiple gearshift positions, and the second operating condition is correlated to a specific position for setting a greater driving force demand in an accelerator-off state than a driving force demand at the drive position.

5. The hybrid vehicle in accordance with claim 2, wherein the fuel increase relation setting module sets the fuel increase relation to enable only the second increase restriction when the set object operating condition is a specific operating condition.

6. The hybrid vehicle in accordance with claim 5, wherein the operating condition setting module includes a gearshift position setting module configured to set an object gearshift position among multiple gearshift positions in response to a driver's gearshift operation, and the multiple operating conditions are correlated to the multiple gearshift positions,
   the multiple gearshift positions include a sequential gearshift position of allowing a driver to select an arbitrary speed as the gearshift position, and
   the fuel increase relation setting module sets the fuel increase relation to enable only the second increase restriction in response to the driver's gearshift operation to the sequential gearshift position.

7. The hybrid vehicle in accordance with claim 1, wherein the electric power-mechanical power input output assembly includes:
   a three shaft-type power input output structure connected with three shafts, the first axle, the output shaft of the internal combustion engine, and a rotatable third shaft and configured to input and output power to and from a residual shaft based on powers input to and output from any two shafts among the three shafts; and
   a generator configured to input and output power from and to the third shaft.

8. A control method of a hybrid vehicle, the hybrid vehicle including: an internal combustion engine; a catalytic converter including a catalyst for purification of an exhaust gas emitted from the internal combustion engine; an electric power-mechanical power input output assembly connected with a first axle as one of axles of the hybrid vehicle and with an output shaft of the internal combustion engine and configured to input and output power from and to the first axle and the output shaft through input and output of electric power and mechanical power; a motor configured to input and output power from and to either the first axle or a second axle different from the first axle; an accumulator configured to transmit electric power to and from the electric power-mechanical power input output assembly and the motor; and an operating condition setting module configured to set an object operating condition selected among multiple operating conditions that define different specifications of a driving force restriction of setting a driving force demand required for driving and a drive point restriction of setting a target drive point of the internal combustion engine corresponding to the set driving force demand, the control method comprising the steps of:

(a) setting an allowable charging power to charge the accumulator based on a state of the accumulator;

(b) determining prohibition or permission for cutoff of fuel supply to the internal combustion engine, based on the set allowable charging power;

(c) setting a fuel increase relation based on the selected object operating condition, the fuel increase relation representing a relation between the allowable charging power and an increase restriction of a fuel supply amount to the internal combustion engine for temperature regulation of the catalyst; and (d) controlling the internal combustion engine, the electric power-mechanical power input output assembly, and the motor to drive the internal combustion engine at a target drive point, which is set based on the drive point restriction of the object operating condition, with an increase of the fuel supply amount according to the increase restriction defined by the allowable charging power and the fuel increase relation in response to a result of the determination in the step (b) and to ensure output of a driving force based on a driving force demand, which is set based on the driving force restriction of the object operating condition.

9. The control method of the hybrid vehicle in accordance with claim 8, wherein the hybrid vehicle further includes a catalyst temperature detector configured to detect a temperature of the catalyst, wherein prohibition of the cutoff of the fuel supply is determined in the step (b), when the temperature of the catalyst detected by the catalyst temperature detector is within a predetermined temperature range and when the allowable charging power set in the step (a) is not lower than a predetermined threshold limit value as charging power, and the step (c) adopts the fuel increase relation, which enables a first increase restriction until satisfaction of a transition condition regarding a relation between the allowable charging power and a tentative limit value that is greater than the threshold limit value as charging power, while enabling a second increase restriction, which has a greater increase tendency of increasing the fuel supply amount than the first increase restriction, upon satisfaction of the transition condition, the step (c) changing the transition condition corresponding to the set object operating condition, so as to set the fuel increase relation suitable for the object operating condition.

10. The control method of the hybrid vehicle in accordance with claim 9, wherein the multiple operating conditions include a first operating condition and a second operating condition, having a driving force restriction with a smaller lower limit of a power range than a driving force restriction of the first operating condition, and the step (c) sets the tentative limit value to a first tentative limit value in response to setting of the first operating condition as the object operating condition, while setting the tentative limit value to a second tentative limit value, which is greater than the first tentative limit value as charging power, in response to setting of the second operating condition as the object operating condition, the transition condition being satisfied when the allowable charging power set in the step (a) decreases below the tentative limit value as charging power.

11. The control method of the hybrid vehicle in accordance with claim 10, wherein the operating condition setting module includes a gearshift position setting module configured to set an object gearshift position among multiple gearshift positions in response to a driver's gearshift operation, and the first operating condition is correlated to a drive position set for ordinary driving among the multiple gearshift positions, and the second operating condition is correlated to a specific position for setting a greater driving force demand in an accelerator-off state than a driving force demand at the drive position.

12. The control method of the hybrid vehicle in accordance with claim 9, the step (c) sets the fuel increase relation to enable only the second increase restriction when the set object operating condition is a specific operating condition.

13. The control method of the hybrid vehicle in accordance with claim 12, wherein the operating condition setting module includes a gearshift position setting module configured to set an object gearshift position among multiple gearshift positions in response to a driver's gearshift operation, and the multiple operating conditions are correlated to the multiple gearshift positions, the multiple gearshift positions include a sequential gearshift position of allowing a driver to select an arbitrary speed as the gearshift position, and the step (c) sets the fuel increase relation to enable only the second increase restriction in response to the driver's gearshift operation to the sequential gearshift position.

\* \* \* \* \*